(12) United States Patent
Wallace et al.

(10) Patent No.: US 6,384,611 B1
(45) Date of Patent: May 7, 2002

(54) ICE THICKNESS DETECTOR

(75) Inventors: Randall W. Wallace, Uniontown; Allen D. Reich, Akron; David B. Sweet, Canal Fulton; Richard L. Rauckhorst, III, N. Canton; Michael J. Terry, Stow, all of OH (US); Marc E. Holyfield, Palm Beach Gardens, FL (US)

(73) Assignee: The B. F. Goodrich Company, Charlotte, NC (US)

(*) Notice: Subject to any disclaimer, the term of this patent is extended or adjusted under 35 U.S.C. 154(b) by 0 days.

(21) Appl. No.: 08/971,801

(22) Filed: Nov. 17, 1997

Related U.S. Application Data
(60) Provisional application No. 60/031,159, filed on Nov. 18, 1996.

(51) Int. Cl.[7] .................... G01R 27/26; G01R 27/08
(52) U.S. Cl. ........................... 324/671; 324/699
(58) Field of Search .................... 324/694, 661, 324/671, 674, 663, 664, 665, 670, 672, 679, 699, 705, 693, 710; 73/170.26; 340/580, 962; 318/483

(56) References Cited

U.S. PATENT DOCUMENTS

| | | | | | |
|---|---|---|---|---|---|
| 3,278,043 A | * | 10/1966 | Deming | .................. | 324/671 |
| 4,766,369 A | * | 8/1988 | Weinstein | .................. | 324/671 |
| 4,881,025 A | * | 11/1989 | Gregory | .................. | 324/671 |
| 5,134,380 A | * | 7/1992 | Jonas | .................. | 324/674 |
| 5,306,992 A | * | 4/1994 | Droge | .................. | 318/483 |
| 5,474,261 A | * | 12/1995 | Stolarczyk et al. | .................. | 244/134 F |
| 5,521,515 A | * | 5/1996 | Campbell | .................. | 324/674 |
| 5,523,959 A | * | 6/1996 | Seegmiller | .................. | 364/550 |
| 5,551,288 A | * | 9/1996 | Geraldi | .................. | 73/170.26 |
| 5,569,850 A | * | 10/1996 | Rauckhorst | .................. | 73/170.26 |
| 5,861,758 A | * | 1/1999 | Berberich | .................. | 324/694 |
| 5,955,887 A | * | 9/1999 | Codner et al. | .................. | 324/689 |

\* cited by examiner

Primary Examiner—Ernest Karlsen
Assistant Examiner—Russell M. Kobert
(74) Attorney, Agent, or Firm—James M. Rashid

(57) ABSTRACT

An ice detector includes a pair of electrodes connected by a pair of leads to a control unit which measures the admittance between leads to thereby sense and detect the presence of ice and other contaminants formed on top thereof utilizing a detection circuit. The electrodes are integrated into patch which can be placed at different locations on an aircraft.

11 Claims, 20 Drawing Sheets

| PRIORITY | THRESHOLD | PRIORITY DELAY | TIME PROJECTION (seconds) | PAR E3/E3 ref |
|---|---|---|---|---|
| P5 | POSITIVE LOCAL MAXIMA | C5 = 1.0 | C5*Δt5 | 0.3 |
| P4 | ZERO CROSSING NEGATIVE TO POSITIVE | C4 = 1.5 | C4*Δt4 | 0.3 |
| P3 | NEGATIVE LOCAL MINIMUM | C3 = 2.0 | C3*Δt3 | 0.3 |
| P2 | ZERO CROSSING POSITIVE TO NEGATIVE | C2 = 3.2 | C2*Δt2 | 0.3 |
| P1 | HIGHEST PEAK GREATER THAN DEADBAND | C1 = 12.0 | C1*Δt1 | 0.3 |
| P0 | ICE ONSET | C0 = 330.0 | C0 | |

DATABASE VALUES

| DESCRIPTION | ELECTRODE | IMPEDANCE VALUE |
|---|---|---|
| ICE ONSET | E1 | 6.00E+05 ohms |
| DEADBAND | | 2.00E-8 microMhos |
| ACCRETION Ref. | E3 ref | 1.2E+07 ohms |
| RESIDUAL | E2-E1 | 3.4E+05 ohms |

TABLE 2

FIG. 15(a)

ICE THICKNESS DETECTOR

This application claims benefit to provisional application 60/031,159, filed Nov. 18, 1996.

TECHNICAL FIELD

The present invention relates to ice detectors, and more particularly, to an ice detector for measuring ice thickness on aircraft surfaces.

BACKGROUND OF THE INVENTION

Under certain operating conditions, aircraft are vulnerable to the accumulation of contaminants on external component surfaces or skins. Examples of such contaminants include ice, water, and mixtures thereof. If left unchecked, the accumulation of ice can eventually so laden the aircraft with additional weight and so alter the airfoil configuration as to cause undesirable flying conditions. The ability to detect the accumulation of ice on such surfaces, and the ability to measure the accumulated thickness thereof so as to identify dangerous flight conditions has therefore become highly desirable.

A number of different kinds of contaminant detectors have been utilized for such objectives. Among them are capacitive ice detectors, examples of which can be found in U.S. Pat. Nos. 4,766,369 to Weinstein, 5,191,791 to Gerardi et al. and 5,398,547 to Gerardi et al., and 5,523,959 to Seegmiller, all of which are hereby incorporated herein by reference.

The Weinstein and Gerardi patents are capacitive type ice detectors. That is, they detect the presence of ice and measures the ice's thickness by measuring changes in capacitance across a pair of spaced electrodes (located flush to the airfoil surface) due to the. presence of ice on the airfoil surface between the electrodes. The Seegmiller patent detects the inductive coupling between a pair of spaced electrodes.

FIG. 1 is a schematic diagram of an ice detector 10 according to the prior art, including the Weinstein and Gerardi patents. A plurality of capacitance measuring circuits 12, 12' measure the capacitance across a pair of leads 14, 16, 14', 16', respectively, which are connected to a pair of electrodes (not shown). The electrodes and ice can be modeled as RC circuits 18, 18'. Capacitor $C_{E1}$, $C_{E2}$ represent the polarization capacitance across the electrodes. RC circuits 20, 20' are circuit models of the ice between the electrodes, and are comprised of a Resistor $R_{I1}$, $R_{I2}$ in parallel with a capacitor $C_{I1}$, $C_{I2}$. A controller 22 is connected to leads 24 and 26 and interprets the outputs of capacitance measuring circuits 12, 12'. Controller 22 may perform such functions as measure the ratio of capacitance detected by the circuits 12, 12' (as disclosed by Weinstein) or use a computer program to "resolve" ice thickness in some other way (as in Gerardi). One of the techniques suggested for this is to use neural networks and store large data files with capacitance signal profiles of the many different types of contaminants and many different types of ice. Capacitance is then measured and the contaminant classified using the stored data.

Pure ice is relatively nonconductive. $R_I$ is therefore large and the capacitance measurement circuits are effective in reading $C_I$.

A drawback to the prior art capacitive type detectors is that contaminants other than ice, such as water, are highly conductive. $R_I$ therefore becomes very small and the capacitance measurement circuits are not effective in reading $C_I$.

Also, water causes changes in the overall capacitance across the electrodes similar to changes caused by ice. Since water and glycol by themselves do not create hazardous flying conditions, it is imperative to be able to distinguish between ice and other contaminants. To this end, it is also necessary to be able to identify the presence of ice on top of a layer of water. Because of the aforementioned capacitance measurement problems, Weinstein and Gerardi distinguish between water and ice by either utilizing a temperature probe in conjunction with their capacitive ice detectors, or by changing the stimulation frequency of the capacitance measurement circuit.

Efforts to improve ice detection systems have led to continuing developments to improve their cost, manufacturability, reliability, usefulness, and efficiency.

DISCLOSURE OF THE INVENTION

An object of the present invention is to provide an ice detector which detects the presence of ice of at least two electrodes and controls an airfoil deicer to deice the airfoil.

According to an aspect of the present invention, an ice detector for detecting a contaminant such as ice on a surface comprises at least three electrodes spaced apart from one another and a signal processor to: (i) determine first and second admittance signals across pairs of the electrodes; and, (ii) detect a contaminant using the temporal trends inherent in the first and second admittance signals.

The present invention provides a highly sensitive ice detector which is easy to manufacture, is highly reliable, is low cost, and is retrofittable onto existing aircraft.

These and other objects, features and advantages of the present invention will become more apparent in the light of the detailed description of exemplary embodiments thereof, as illustrated by the drawings.

BRIEF DESCRIPTION OF THE DRAWINGS

FIG. 15(a) is a table (Table 2) that lists a Percent Accretion Ratio for each Priority.

BEST MODE FOR CARRYING OUT THE INVENTION

Figure 1:
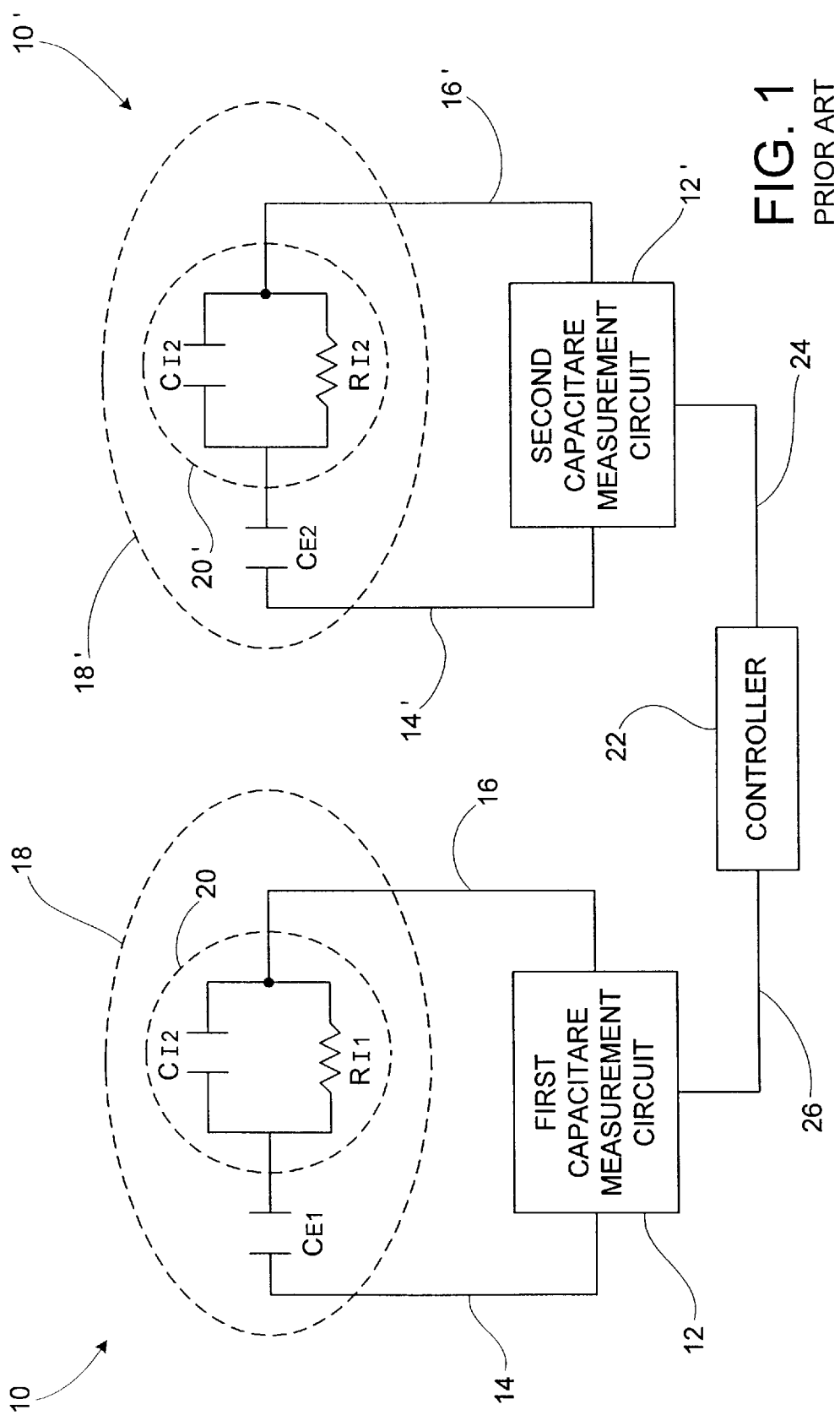
FIG. 1 is a schematic diagram of a prior art capacitive ice detector.
Figure 2:
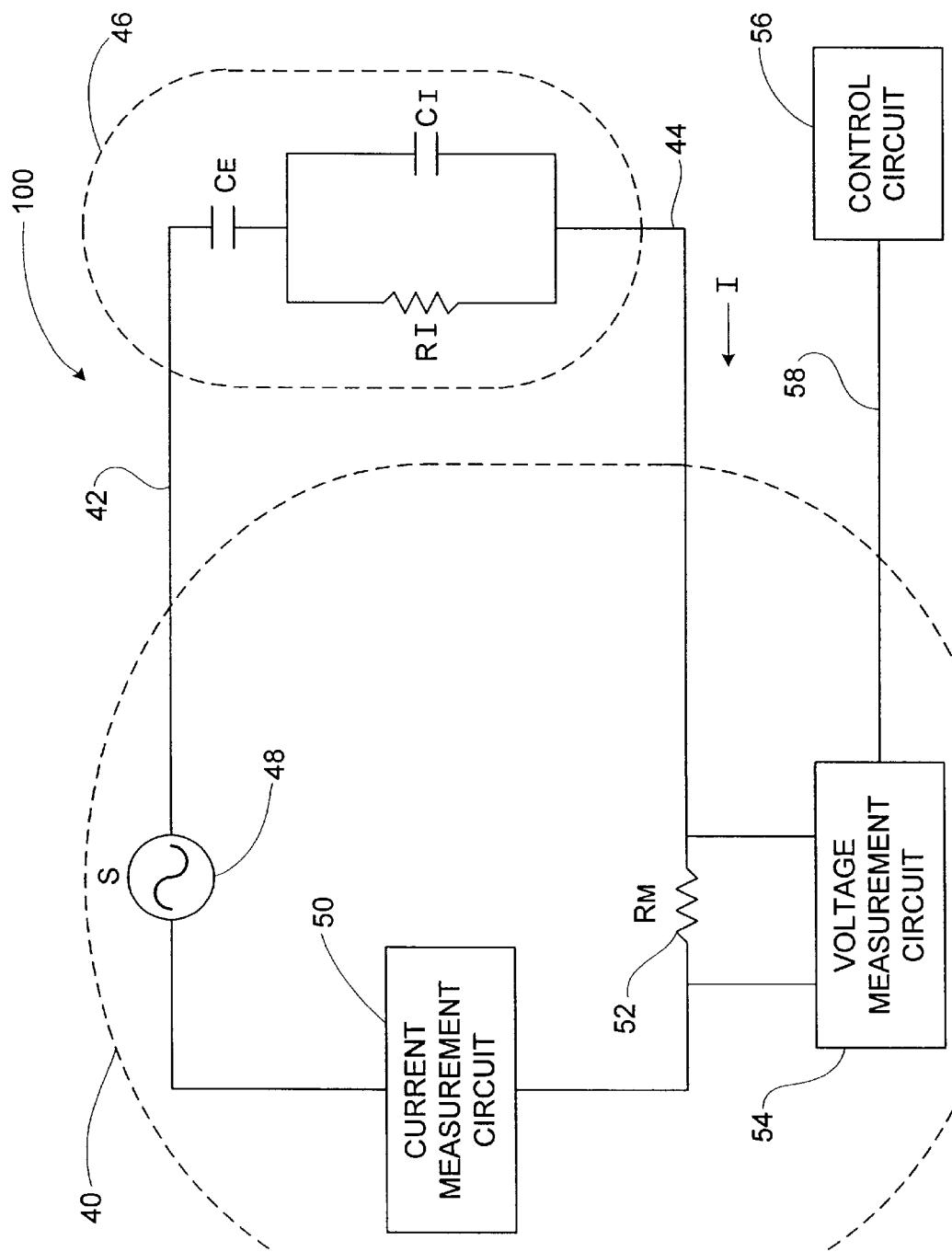
FIG. 2 is a simplified schematic block diagram of an ice detector and model ice circuit in accordance with the present invention.

Referring now to the drawings wherein like reference numerals designate like or corresponding parts throughout different views, there is shown in FIG. 2 a schematic diagram in accordance with the present invention. An impedance measurement circuit 40 is connected by leads 42, 42 to a pair of electrodes (not shown) for measuring ice (or other substance or contaminant), represented by model RC circuit 46. The electrodes are a pair of conductive strips spaced apart and located at the surface of the airfoil. Circuit 40 measures the total impedance across the electrodes. In the example of FIG. 2, a signal generator 48 supplies current through the electrodes and ice. The impedance across leads 42, 44 is calculated by either measuring current directly with a current measuring circuit or by measuring the voltage across a current sensing resistor with a voltage measurement circuit 54. The amount of current flowing through leads 42 and 44 is a function of the impedance therebetween. Voltage measurement circuit 54 is connected to a control circuit 56 via a line 58.

Figure 3:
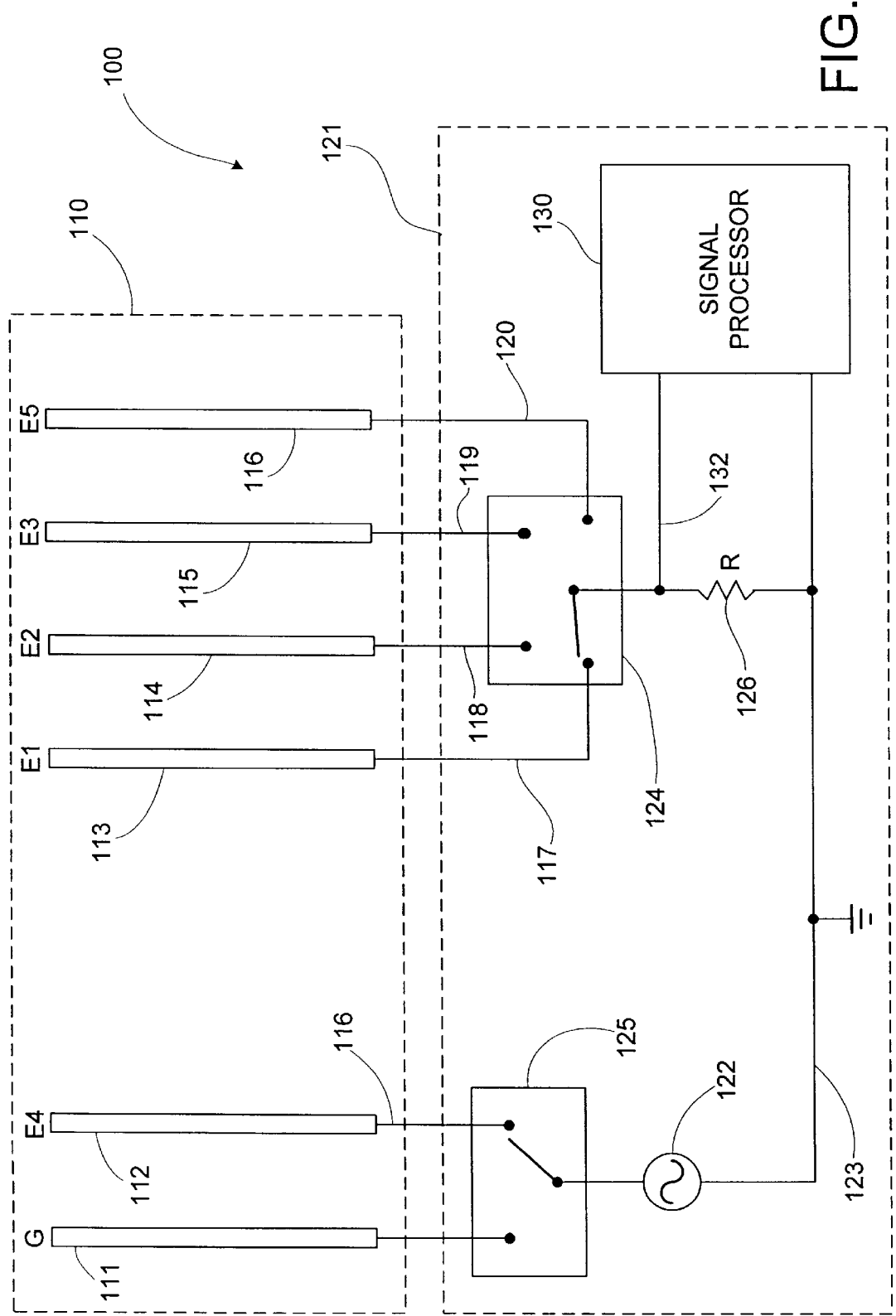
FIG. 3 is a simplified schematic block diagram of an ice detector and ice detector electrodes in accordance with the present invention.

Referring now to FIG. 3, wherein an ice detector 100 in accordance with the present invention includes a guard layer 111 and an electrode group 110 of five electrodes (or elements) 112–116 connected by leads 116–120 to a controller means or control unit 121. Control unit 120 includes a signal source driver 122 connected between ground 123 and electrode 112 (E4) for that electrode. The signal provided by driver 122 is returned by one or more of electrodes 113–116 (E1–E5). A switch, 124 controls which electrode is connected to a resistor 126 (R). Another switch 125 controls whether the driver electrode 112 or the guard layer 111 is connected to the signal driver 122. The voltage across resistor 126 is detected by a signal processor 130 via a lead 132 and ground 123. Signal processor 130 also processes the signal as will be described in greater detail hereinafter. Additional circuitry for processing the voltage signal across resistor 126 is disclosed in commonly owned, copending U.S. patent application Ser. No. 60/009,159, now expired, entitled Impedance Ice Detector, the disclosure of which is hereby fully incorporated herein by reference.

Figure 4:
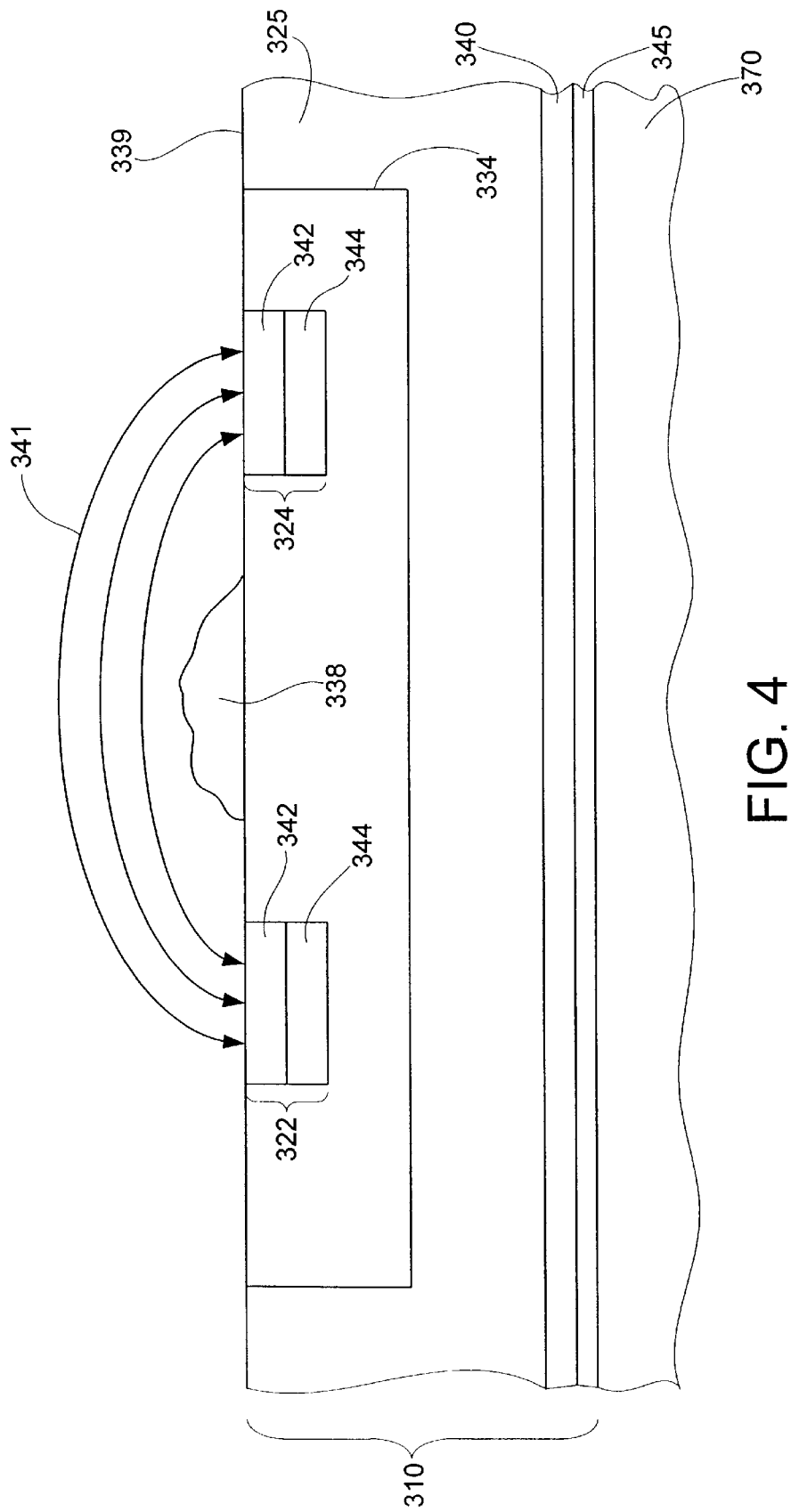
FIG. 4 is a cross sectional view of an ice detector in an ice detection patch in accordance with the present invention.

Referring now to FIG. 4, electrodes 322, 324 such as those described hereinbefore, are integrated into a resilient (or elastomeric) ice detection patch 334 described in greater detail hereinafter, which is integrated into a resilient deicer 325. The deicer 325 may be attached or bonded to an airfoil 370 or other substrate. It is to be noted that other electrode configurations not explicitly shown herein may be utilized in the present invention. Ice detector 310 includes a non-conductive patch 334 disposed within a deicer 325. Deicer 325 is disposed over a guard layer 340. Guard layer 340 is utilized to minimize stray capacitance by eliminating electric field lines between the electrodes and the airfoil surface 370. Guard layer 340 is disposed over a nonconductive resilient layer 345. Lines 341, between electrodes 322 and 324, represent either field lines in the case of a nonconducting path (as with capacitance measurement) or a current path in the case of a purely resistive path. The lines will be affected by the accretion of ice or other contaminants 338 in proximity of the electrodes. Electrodes 322, 324 are integrated into patch 334 and are comprised of a top layer 342 of conductive resin, an a bottom layer 344 of conductive material. It is to be noted, however, that although the layers described herein are used for illustrative purposes, and that curing of materials usually results in the materials blending to create structures without clearly defined layers. Electrodes 322, 324 are used to measure ice 338 or other contaminants disposed on the exposed side 339 of detector 310. Patch 334 is preferably an approximately 0.02 inch thick non-conductive urethane film, such as catalog number 121JC202 available from the B.F.Goodrich Company. Guard layer 340 is preferably an approximately 0.003 inch thick copper mesh. Top electrode layer 342 is preferably an approximately 0.010 inch thick layer of conductive urethane resin, such as catalog number 0121JC205 available from the B.F.Goodrich Company. Bottom electrode layer 344 is preferably comprised of a nickel coated unidirectional graphite fiber bundle (such as those available from Inco), impregnated with a conductive urethane resin matrix such as catalog number 0121JC205 available from the B.F.Goodrich Company. The preferred graphite fiber bundle consists of a 3K harness and a 50% nickel coating on each filament. Electrode layer 344 may also be comprised of other fabrics or materials, such as aramide fibers treated with a conductive material.

Fabrication of ice detector 310 is as follows.

Roll one ply of raw nonconductive urethane onto a stainless build metal. Vacuum bag and cure at 280° F., 25 psig for 40 minutes.

Mix a conductive urethane by combining a carbon black, such as EC-600 with a urethane cement, such as CP-9 and placing the solution onto a drum roller in a small ball mil for a minimum of 18 hours.

Brush the material onto aluminum mold (sponge-brush). Build up layers at 15 minute intervals until the material is flush with the surface of the tool.

Trim and remove the dried material from the tool and lay on a stainless build metal. Vacuum bag and cure at 280°, 40 min., 25 psi.

Cut nickel coated graphite fabric to the specified length. Apply flux to approximately 0.75" of each end of graphite tape and using solder pot tin ends of electrodes. Apply tinned graphite tape to a butyl mat by employing double faced tape at each tinned end. Expose graphite tape to a 30 second period of Corona treatment. Apply a micro-molecular layer of EC3901 primer to freshly corona treated graphite. Rotate treated graphite strip to untreated side and repeat the last two procedures. Place into hot air oven and allow to bake for 30 minutes at 250 F. Remove from oven and permit electrodes to fully cool to room temperature before proceeding to the next procedure. Dip electrodes in a container of conductive urethane resin matrix. Electrode must be completely covered by adhesive except for one tinned end. Repeat dipping procedure a total of three times. Allow 15 minutes dry time between each electrode coating.

Adhere the sensor pattern to MYLAR with 3M77 Spray Adhesive. Trim to finish size. Lightly spray MYLAR with 3M77 Spray and position on cured nonconductive urethane film. With a razor knife and straight edge, cut out electrode strips through pattern, MYLAR, and urethane film. Lathe cut strips of the cured conductive urethane resin matrix to fit into cutouts in the nonconductive urethane film. On the outboard end of the sensor, place a 0.75"×1.625" piece of nonconductive rubber coated fabric, such as catalog number NS1001 available from the B.F.Goodrich Company. This is to prevent the tinned electrodes from protruding through surface of nonconductive urethane film. Place the treated graphite electrodes in the center of the conductive urethane strip. Cut the inboard end of electrode to length. Place one layer of 204/3 TEFLON tape over the tinned end of the electrodes approximately the same size as the NS1001 which is under the tinned end of electrodes. Cut an additional layer of nonconductive urethane film the same overall size of the sensor packet. Place the layer over the packet and prepare for cure. Cure the packet at 280° F. for 40 minutes under 40 PSIG autoclave pressure.

An alternate manufacturing procedure can be found in commonly owned U.S. patent application Ser. No. 08/437004, filed May 8, 1995, now U.S. Pat. No. 5,569,850, entitled Ice Detector, the disclosure of which is hereby fully incorporated herein by reference.

Ice detector 310 may then be combined further into a deicer assembly, or it can be utilized as an ice detecting "patch kit" which can be applied almost anywhere on the aircraft. If the ice detector 310 is utilized as a patch kit, the preferred thickness of the non-conductive patch is 0.05 inches thick. An appropriate bonding glue is necessary to bond the patch kit to the aircraft.

Figure 5:
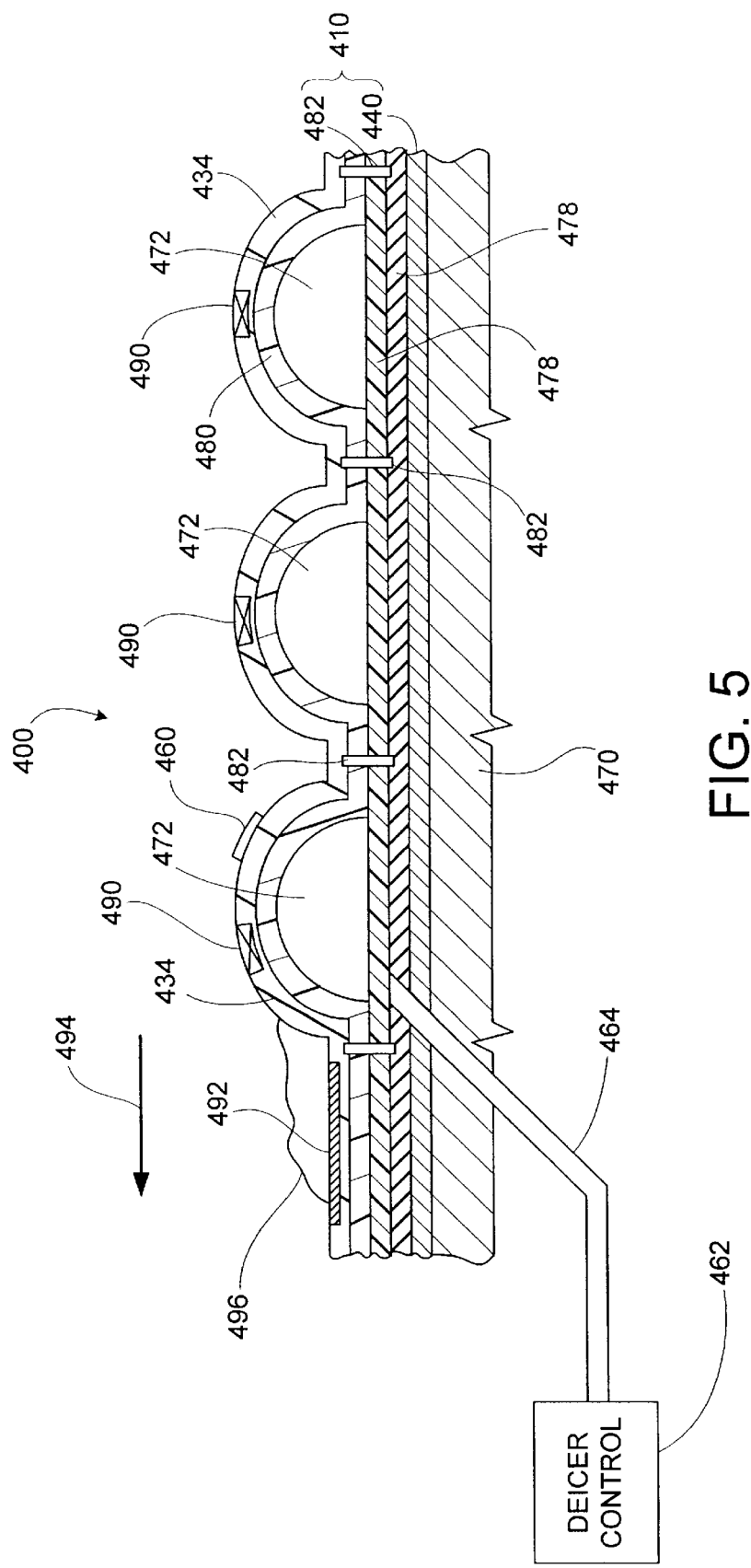
FIG. 5 depicts three ice detector elements imbedded in a deicer system in accordance with the present invention.

Referring now to FIG. 5, a pneumatic deicing system 400 in accordance with the present invention which includes a deicer assembly 410 comprised substantially of a composite of flexible materials. The deicer assembly 410 is formed as part and parcel of an airfoil skin 470 thereby defining the outer contour of the airfoil. Deicer assembly 410 is typically disposed on the leading edge of the airfoil and is thereby referred to as a leading edge deicer. The preferred method of integrating the deicer assembly 410 with the airfoil 470 is to provide an airfoil, manufacture the deicer assembly as a separate entity, and bond or attach the deicer assembly onto the airfoil at the desired location. The preferred bonding means to attach a deicer assembly 410 to the airfoil 470 is to apply an adhesive, such as catalog number 1300L manufactured by the 3M corporation, to both contacting surfaces.

The principle inflatable portion of the deicer assembly 410 is a plurality of tube-like passages 472 formed therein and arranged substantially parallel to one another in the spanwise direction of the airfoil. Tube-like passages expand or inflate when provided a pressurized fluid, such as air. All inflatable tube-like passages 472 are fluidly connected at one end of deicer assembly 410. The preferred construction for deicer assembly 410 is a composite, comprised from bottom (the side of material bonded to the airfoil) to top of: a) a guard layer 440 such as guard layer 140 described hereinbefore; b) a bottom layer or ply 476 of flexible material, such as neoprene; c) a first intermediate, nonstretchable layer or ply 478 of nonstretchable fabric such as nonstretchable nylon which is rubber coated on one side; c) a second intermediate, layer or ply 480 of stretchable fabric, such as stretchable nylon which is rubber coated one side; and, e) a top layer or ply 434 of a tough yet pliable weather impervious material, such as non-conductive urethane or neoprene. An inflation pattern is created by sewing the nylon layers 478, 480 together in a predetermined pattern using thread 482. The preferred material for thread 482 is nylon or KEVLAR. KEVLAR is a registered trademark of E.I. Dupont Denemours Corporation. Layers 434–480 and 476–478 may be bonded together utilizing an appropriate cement, such as catalog number CHEMLOC 420 manufactured by the Lord Corporation. CHEMLOC is a registered trademark of the Lord Corporation. The inflation pattern consists of a series of high inflation areas or passageways 472, created by stitches 482. Ice detectors 490 similar to ice detectors 110 described hereinbefore are integrated into top layer 434. Detectors 490 are illustrated running substantially in a spanwise direction. An ice detector 492, is also integrated into deicer 410 but runs substantially in a chordwise direction, illustrated by arrow 494. Arrow 494 also illustrates the direction of airflow over deicer 410. Under certain conditions, ice 496 will accumulate chordwise aft of the deicer 410 assembly. This type of accumulation is known in the art as runback ice. It can therefore be seen that ice detector 492 can be utilized to detect runback ice. Of course, deicing patches 490 could be utilized with and integrated into other types of deicing systems or other systems.

An accelerometer, motion sensor or pressure sensor 460 may be disposed in layer 434 also. These sensors are utilized to detect the movement of the layer 434 or the pressure being applied to layer 434.

A deicer control 462 provides pressurized fluid through a line 464 to the inflatable tubes in a predetermined inflation sequence.

Figure 6:
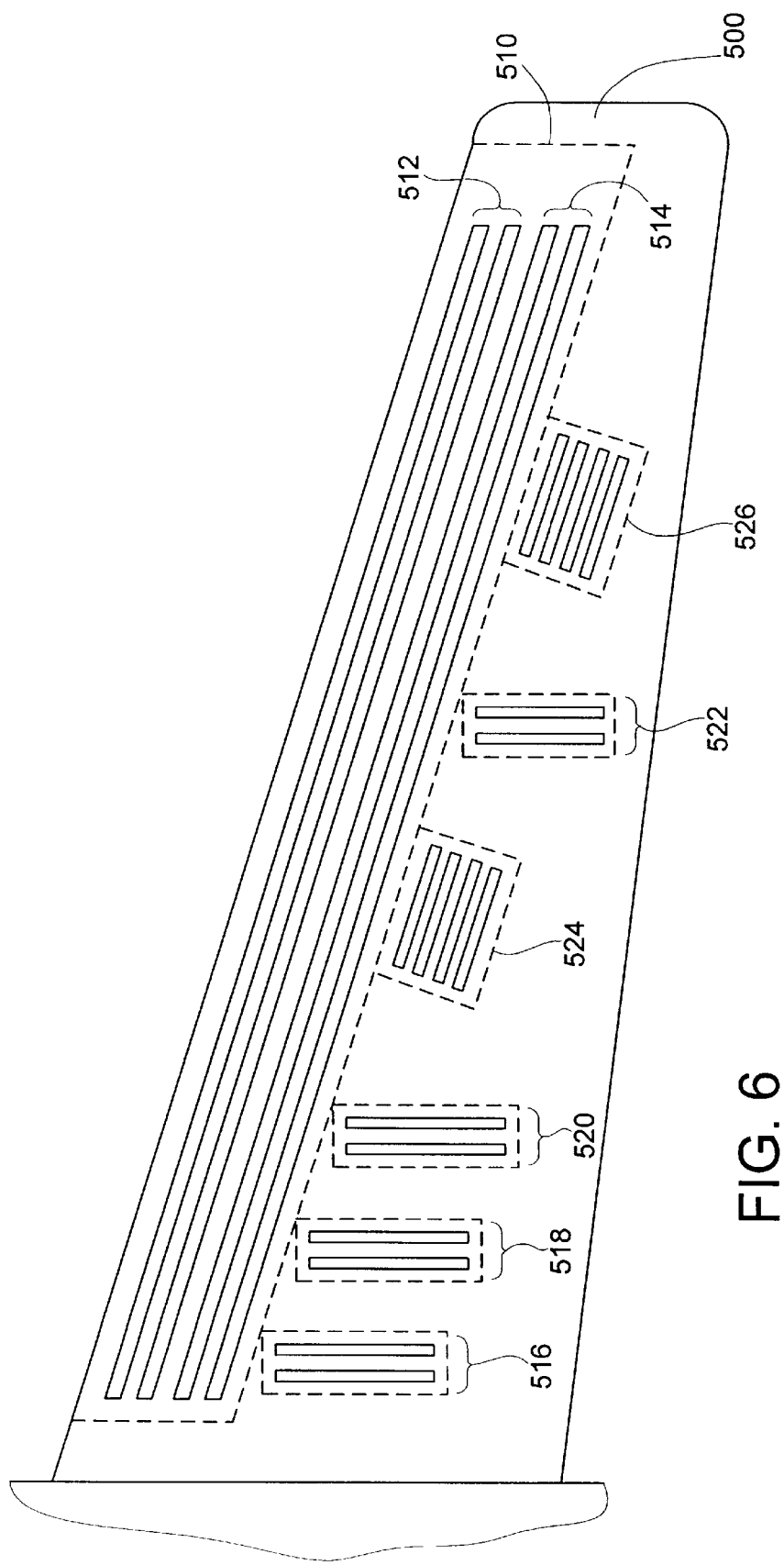
FIG. 6 is a top schematic view of an airfoil having ice detectors in accordance with the present invention.

Referring now to FIG. 6, an airfoil 500 includes a deicer 510. A plurality of electrode pairs 512, 514 (disposed either within deicer 510 or on top of it as a patch) are arranged substantially parallel to each other in the spanwise direction. A plurality of electrodes pairs 516, 518, 520 and 522 are arranged generally in a chordwise direction aft of the deicer 510. A plurality of electrodes groups 524, 526 are also arranged generally in a spanwise direction aft of the deicer 510. It has been found that the present invention facilitates an infinite number of possibilities in the arrangement of the detectors. For instance, one or both electrode pairs 512, 514 may be positioned aft of deicer 510 and one or more of electrode pairs 516–522 may be positioned more chordwise forward than presently shown. The present invention also permits the use of electrodes which can run substantially the entire length of the airfoil, thereby making it possible to "cover" large areas with a single detection circuit. It is to be noted that the preferred electrode construction of the present invention provides electrodes having a length, a width and a thickness, and wherein the length of the electrodes is substantially greater than the width and thickness. The electrodes are disposed at the surface of the airfoil, wherein the length of the electrodes runs substantially parallel to the plane of the airfoil surface. To this end, it is preferred to have the electrodes arranged in parallel pairs, where the electrodes are generally rectangular in cross-section (lengthwise and widthwise) and have a length of on the order of 5 inches, a width of on the order of 0.10 inches, a thickness of on the order of 0.10 inches, and a spacing between the electrodes of on the order of 0.10 inches.

Figure 7:
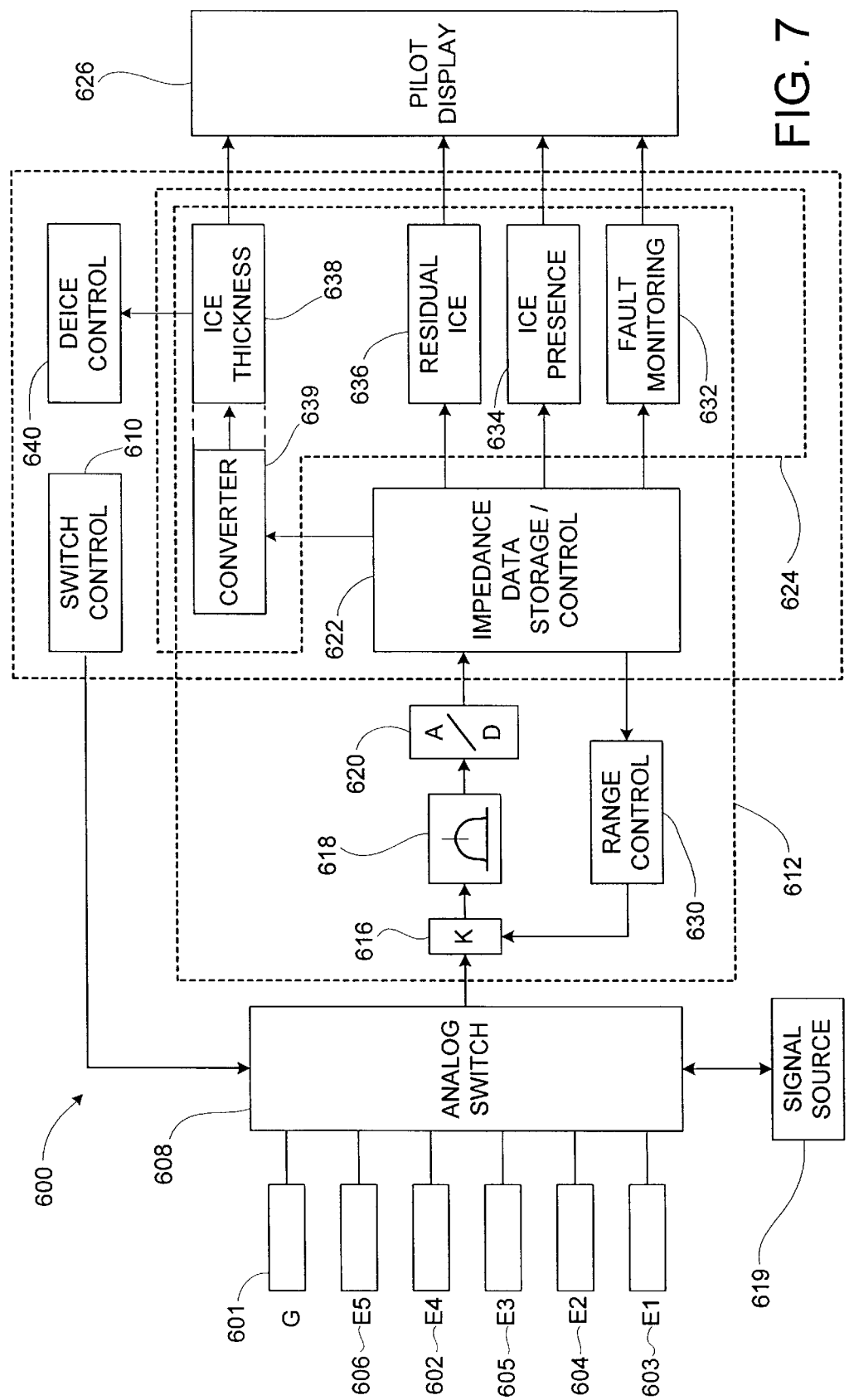
FIG. 7 is simplified schematic block diagram of an ice detector circuit in accordance with the present invention.

Referring not to FIG. 7, wherein an ice detection system 600 in accordance with the present invention includes a drive electrode 602 (E4), and four return electrodes 604–606 (E1, E2, E3, E5) and a guard layer 606 (G), where electrodes are spaced at different distances to the drive electrode than electrode. An analog switch or multiplexer 608, controlled by controller 610 controls which electrodes are connected to a signal processor 612. A signal source/controller 614 provides an AC drive signal to either the drive electrode or the guard layer (also controlled by switch 608). The return analog signal from controller 614 is provided through the multiplexer 608 to an amplifier circuit 616 which adjusts the amplitude of the signal. The analog signal may be provided in the form of a voltage or current. The amplified signal is provided to a signal filter 618 (preferably a low pass filter). The filtered signal is provided to an analog to digital converter 620 (A/D), which digitizes the signal. The digitized signal is provided to a digital data storage and control circuit 622 which stores the digitized return signal data. The digitized return signal data is then utilized by a data interpreter circuit 624 to compile, manipulate, analyze and interpret the stored data. The data interpreter circuit 624 provides information to a pilot via a pilot display system 626. The digital data storage and control circuit 622 also provides data to a range control circuit 630 which controls which thereby selects and controls the gain of the amplifier circuit 616.

The data interpreter circuit 624 may be described as a plurality of circuits or modules. A first circuit 632 is a fault monitoring circuit which provides the pilot with information as to the integrity of the ice detector 600 and the aircraft deicer (not shown in FIG. 7). A second circuit 634 detects the presence of a predetermined amount of ice deposited over the electrodes 602 and 604 or 606. A third circuit 636 detects the presence of ice on over the electrodes after the deicer has attempted to deice the airfoil. Ice which is not shed after a deicing shedding cycle is known as residual ice. A fourth circuit 638 measures the thickness of the ice over the electrodes and provides information to the pilot on the thickness of ice and also provides commands to a deicer control circuit 640. A converter circuit 639 is provided impedance data from circuit 622 and calculates admittances from the impedance data and provides the admittance data to ice thickness circuit 638. Converter 639 and circuit 638 may be combined into a singular circuit.

Fault monitoring circuit 632 monitors a number of conditions, such as whether the deicer boot has inflated. This is done by connecting the drive signal to the guard layer and measuring the impedance between the guard layer and the electrodes. If the impedance does not change significantly during an inflation cycle, then it can be assumed the deicers did not inflate. Circuit 632 also checks the integrity of the circuit connections, the analog circuits and the digital circuits.

Figure 8A:
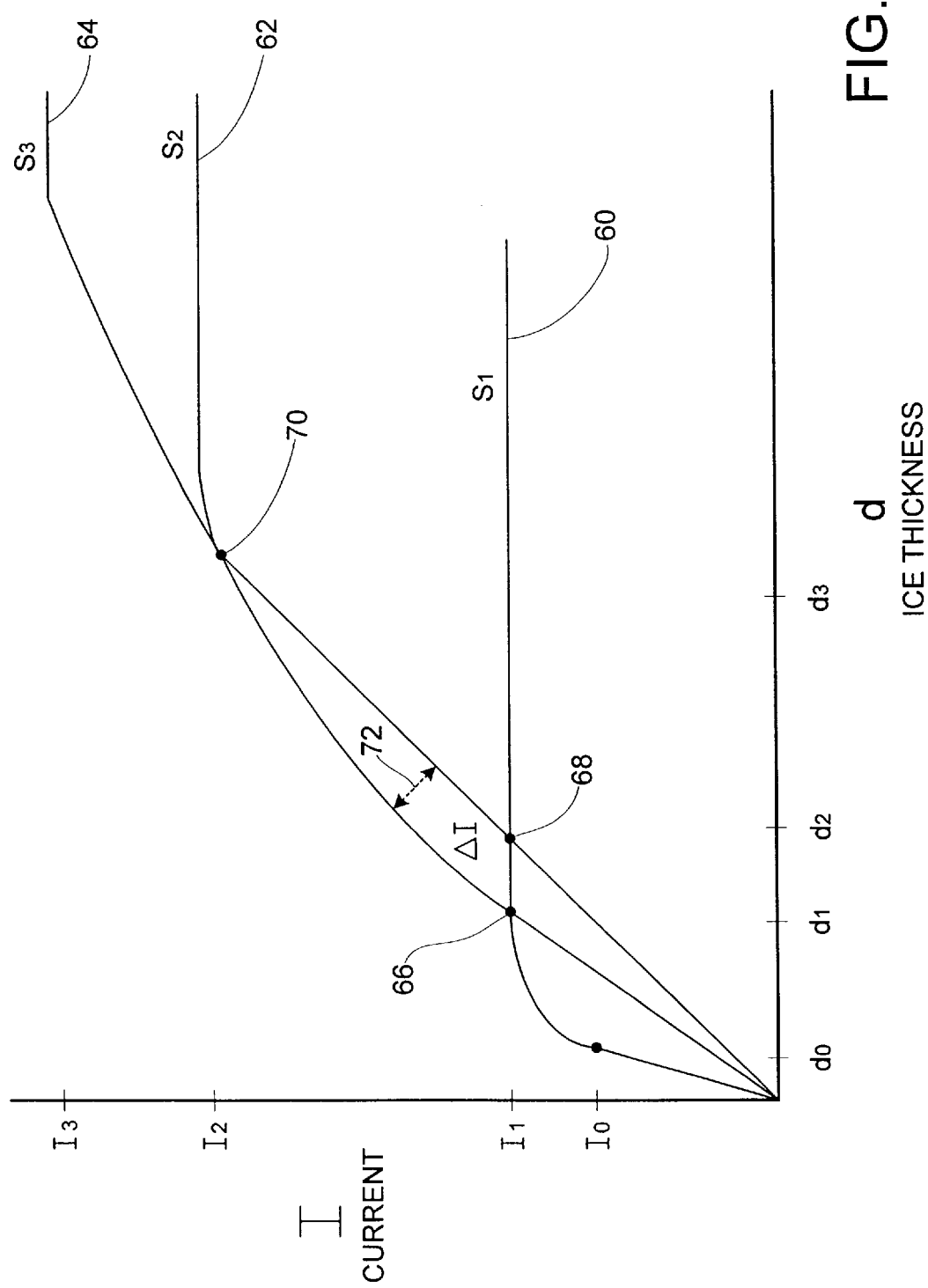
FIG. 8a is a graph showing the response of the ice detector of FIG. 2 for varying ice thickness.

Referring now to FIG. 8a, wherein a graph of the current flow I (through the circuit illustrated in FIG. 2 and measured by the impedance measurement ice detector of the present invention) versus ice thickness is depicted. A set of curves 60, 62, 64 illustrate typical response for three ice detectors, each detector having a pair of electrodes separated by a given spacing $S_1$, $S_2$, $S_3$, respectively, where $S_3 > S_2 > S_1$. It can be seen that the current of curves 60, 62 and 64 saturate out at values $I_1$, $I_2$, and $I_3$, respectively. The slopes of the current curves are approximately linear before the saturation level. Curves 60 and 62 intersect at a point 66, which correlates to a specific ice thickness $d_1$. Likewise intersection points 68 and 70 correlate to specific ice thickness's of $d_2$ and $d_3$.

The delta current ($\Delta I$) between curves 62 and 64 is represented by line 72. $\Delta I$ between the curves varies as ice thickness varies. Referring to curve 60 an ice thickness of $d_0$ provides a current level of $I_0$. Referring to curves 62 and 64, for ice thickness's below $d_3$ the value of current for curve 64 is always below the value of current for curve 62. The converse is true for ice thickness's above $d_3$. A simple determination can be made of whether the thickness of ice is below, equal to, or above $d_3$ by comparing the current flowing in the $S_3$ detector circuit to the current flowing in the $S_2$ detector circuit. For ice thickness below $d_1$, the current in the $S_1$, circuit will be above the current in the $S_2$ circuit. For ice thickness above $d_2$, the current in the $S_1$ circuit will be below the current in the $S_2$ circuit.

Figure 8B:
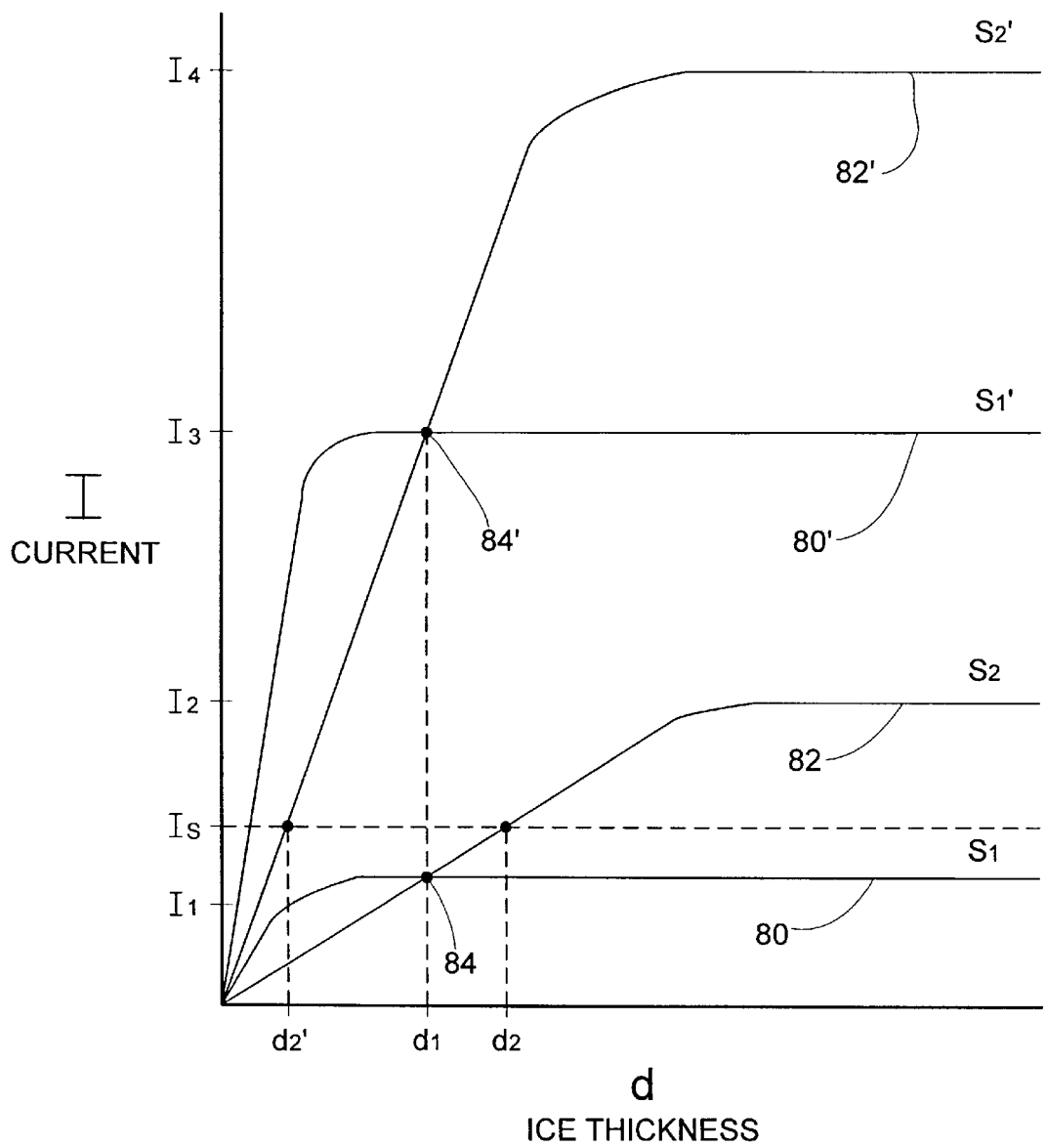
FIG. 8b is a second graph showing the response of the ice detector of FIG. 2 for varying ice thickness.

Referring now to FIG. 8b, wherein a graph of the current flow I (through the circuit illustrated in FIG. 2 and measured by the impedance measurement ice detector of the present invention) versus ice thickness is depicted. A set of curves 80, 82 illustrate typical response for two ice detectors, each detector having a pair of electrodes separated by a given spacing $S_1$, $S_2$, respectively, where $S_2 > S_2$. It can be seen that the current of curves 80, 82 saturate out at values $I_1$ and $I_2$, respectively. The slopes of the current curves are approximately linear before the saturation level. Curves 80 and 82 intersect at a point 84, which correlates to a specific ice thickness $d_1$. A set of curves 80' and 82' illustrate a typical response of the same ice detectors $S_1$ and $S_2$, but wherein the conductivity of the ice is greater than that for curves 80 and 82. The conductivity of the ice is a function of the liquid water content of the ice. Ice with a higher liquid water content than that of curves 80, 82 (and being more conductive) is represented by curves 80' and 82'. The intersection points 84 and 84' occur generally at the same ice thickness d1. The present invention is therefore an improvement over prior capacitive ice detectors in that the thickness measurement technique of the present invention is insensitive to the liquid water content of ice. Prior capacitive ice detectors cannot measure wet ice because the capacitance across the electrodes is difficult if not impossible to measure due to the low resistance between electrodes. It is to be noted, however, that the conductivity of ice is also a function of the way water is dispersed within the ice. The term used to describe the dispersion of water within the ice hereinafter is uniformity. The curves illustrated in FIGS. 8a and 8b will therefore vary in accordance with the uniformity of the ice. Intersection points 66, 68, 70, 84 and 84' may be shifted if the ice is nonuniform or nonheterogenous. The electrodes of the present invention must therefore be configured and located for optimal measurement results.

It is to be noted that the intersection of curves S2 and S2' with a specific current level or threshold $I_5$, occur at different thickness points. The lower conductive ice S2 will provide higher thickness reading of d2 and the higher conductive ice s2' will provide a lower thickness reading d2'.

Ice can be detected and its thickness determined more effectively by measuring the amount of current flowing in an electrode type ice detection circuit. Since the current flow is a function of impedance, the present invention is an impedance ice detection apparatus. This impedance measurement technique provides an ice detection system greatly simplified over prior art systems, as will be described in further detail hereinafter.

It is to be further noted that the intersection point 70 occurs before both curves 62 and 64 have reached saturation. Ice detection and measurement can be accomplished effectively without having to saturate out the electrodes giving the present invention more measurement flexibility than prior systems. Prior capacitive type ice detectors required saturation of the circuit for their measurement techniques, which means only a limited number of data points could be gathered during a detection query cycle.

Referring now to FIGS. 7 and 8a, ice presence circuit 634 detects a predetermined thickness $d_0$ of ice over the electrodes by monitoring the amplitude of the return current I from signal source 614 and determining when the current reaches a predetermined level $I_0$.

The return current signal from the electrodes provides data on the impedance of the ice over the electrodes. This measured impedance signal is influenced by electrode geometry, the thickness of the ice formation as well as the properties (conductivity and structure) of the ice and the amount of water contained in the ice. One method of achieving compensation for conductivity changes is to compare signal levels between electrodes with different spacing. This may be done by the use of different electrode geometry and multiple electrodes which are multiplexed to provide a more comprehensive description of the ice formations. FIGS. 8a and 8b illustrate and describe this technique for measuring ice thickness. Ice thickness measurements are easily obtained with this technique when the reference surface is clean and the ice is well bonded to the airfoil surface. Detection becomes more difficult, however, when the ice is not uniform or it is debonded from the surface, or it is fractured or the surface is not clean. In particular, use of the simple electrode response comparison between narrow and widely spaced electrodes as shown and described for FIGS. 8a and 8b provides poor ice thickness data during repeated ice removals from an instrumented deicer. This comes about because even small amounts of residual ice shift the initial or reference settings sufficiently to defeat the compensation of the simple ratio compensating algorithm.

Figure 9:
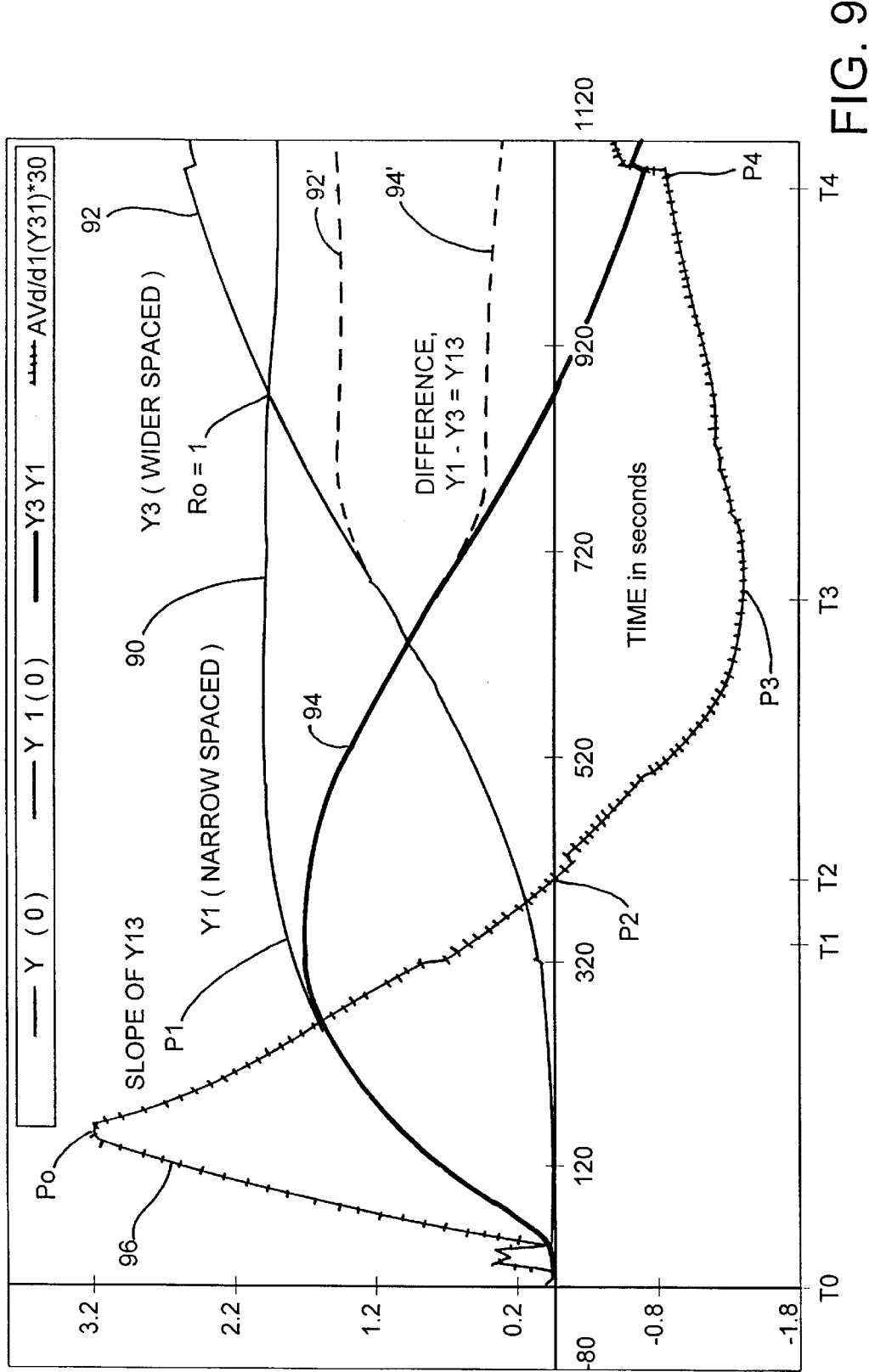
FIG. 9 is a graph showing the response of an ice detector in accordance with the present invention for varying ice thickness.

Referring now to FIG. 9, wherein a graph of admittance data from the electrodes versus time is illustrated. Signal source 614 provides an AC voltage, preferably at an audio frequency. The response provided through the return electrodes is measured as a complex impedance which in the most general case may be inductive, capacitive or purely resistive, depending upon the phase of the voltage and current as sensed in the output resistor R (see FIG. 3). Circuit 639 computes the admittance, Y, hereby defined here as 1/Z, where Z is the total impedance between the source and return electrodes. Y1 gives the admittance value from a closely spaced electrode and Y3 gives the admittance value from a widely spaced electrode.

FIG. 9 shows a typical admittance response curve over time as ice accumulates over the electrodes and ice thickness increases. The horizontal scale shows time of accretion out to 1120 seconds. Admittance relationships with ice thickness will be generic for all conditions. A Y1 curve 90 shows a rapid rise followed by saturation after about 400 sec. A Y3 curve 92 rises more slowly, crossing Y1 at about 900 sec. A difference curve 94 shows the difference between the Y1 and the Y3 signals (Y1−Y3=Y13). A slope curve 96 shows the slope or derivative of the Y13 curve. Curve 96 represents the equation $$C96 = \frac{d}{dt}(Y1 - Y3) \qquad \text{Equation 1.}$$

Referring now to FIGS. 7 and 9, the ice thickness circuit 638 functions to determine ice thickness by estimating useful ice thickness outputs even with changing conditions between ice removals which often include distorted responses from the electrodes. The principle of operation of circuit 638 involves the use of the temporal trends inherent in the electrode responses as the ice formation builds during the icing encounter. The trends are determined by computing the time derivative of the difference between the wide spaced to the narrow spaced electrodes. The response provided through the return electrodes is measured as a complex impedance which in the most general case may be inductive, capacitive or purely resistive, depending upon the phase of the voltage and current as sensed in the output resistor R (see FIG. 3).

FIG. 9 shows that the maximum point P0 of the slope curve 96 occurs at a small time (approximately 120 seconds), a zero crossing P2 (approximately 400 seconds) and a minimum point P3 (approximately 700 seconds). These extrema define the points in time for the maximum rates of change arising in the combination of Y1 and Y3. Applicants have discovered that these extrema are present regardless of level changes in the Y1 and Y3 curves. The ice measurement techniques shown and described for FIGS. 8a and 8b can be defeated by level changes. For instance, dotted lines 92' and 94' of FIG. 9 shows that curves Y1 and Y3 might not intersect. The ice measurement techniques shown and described for FIGS. 8a and 8b however, depend on these intersection points for ice thickness measurement. Utilization of specific points, (such as P0, P1, P2, P3, P4 etc.) on the slope curve 96 provides a level of immunity from distortion in the shapes and trends in Y3 and Y1 which may arise from chaotic ice formations.

Circuit 638 computes a progression of conditions relying on the slope curve 96 in order to predict or project a time when the accumulated ice will reach a targeted thickness. This projected time may then be utilized to trigger the deicer to cycle and remove the ice. For example, a succession of deice projections can be constructed using predetermined points on curve 96 to serve as a series of "safety nets". The preferred predetermined points are those that are relatively immune from noise and distortion. Such points are illustrated on slope 96 as P0; P1, P2, P3 and P4. Each successive safety net functions with an decreased size of potential error, but is active only after the more accurate (shorter time projections) have failed. A table of prioritized projected times utilizing predetermined threshold points is illustrated below in TABLE 1.

TABLE 1

| PRIORITY | THRESHOLD | PROJECTION |
| --- | --- | --- |
| 1 | P0 | C1 × t (P1) |
| 2 | P2 | C2 × t (P2) |
| 3 | P3 | C3 × t (P2) |
| 4 | P4 | t (P4) |

A preferred usage of the projection points is illustrated in TABLE 1 and FIG. 9. The first preference projection is P0, which is at the peak of the slope difference curve. TABLE 1 shows a multiplication or calibration factor of C1 for P0. The time projection is computed by multiplying the time at which this peak is detected by C1. If other conditions are detected this projection is deactivated. If this is the only condition detected this projected time will be used to fire the deicer. In most cases the accretion will continue to generate the curves, and the next action will be the detection of P2, which is the zero crossing of the slope difference curve. TABLE 1 shows that this has a factor of C2 which is multiplied by the time of the crossing. P0 is now deactivated and a shorter projection is in effect. The potential projection error is reduced by 50% because the projection time is reduced by that factor. As the accretion proceeds further the slope difference goes through a minimum P3. When this is detected P2 is deactivated and a projection constant of C3 is used to define a shorter projection. The error is reduced further. Finally, P4 is reached. This is determined as the point in time when the amplitude of the slope difference curve decreases by a percentage from the maximum magnitude reached at P3. When this condition is observed the deicer is fired immediately without a time projection. It can be seen that P3 corresponds closely to the crossing of the Y1 and Y3 signals.

Figure 10:
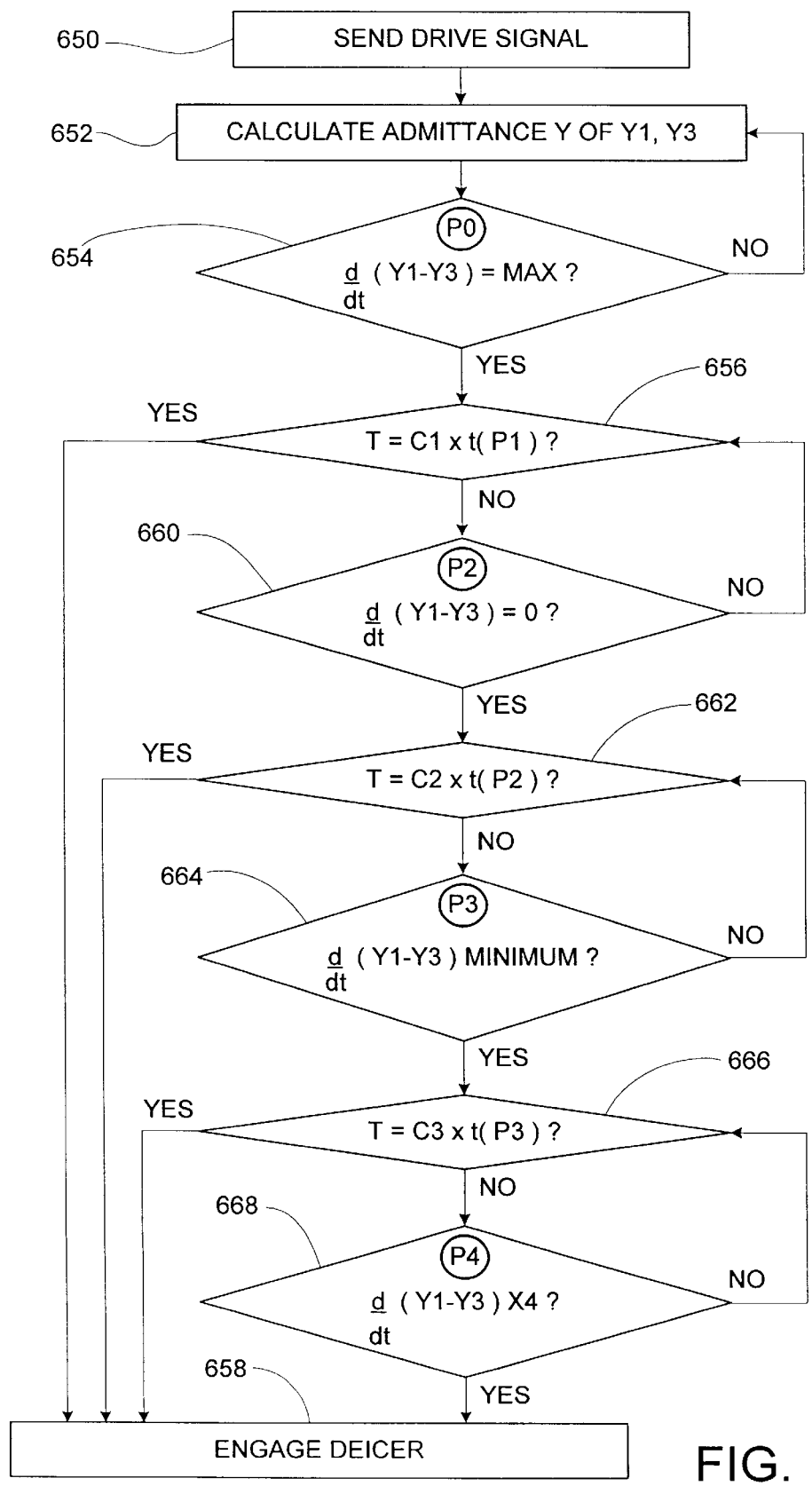
FIG. 10 is a simplified logic flow diagram of a routine for determining ice thickness projection points for engaging a deicer in accordance with the present invention.

Referring now to FIGS. 10, 7 and 9 and TABLE 1, a flow chart describing the function of ice thickness circuit 638 utilizing thresholds P0–P4 includes a first step 650 in which a drive signal is provided to the drive electrode and the return signal is monitoring through return electrodes by switching between them utilizing multiplexer 608. In a next step 652 the admittance Y of the electrode circuits is calculated. Also calculated is Y1–Y3 and the derivative of Y1–Y3, represented by d/dt (Y1–Y3). The time from the initiation of the cycle is constantly monitored.

In a next step 654, a determination is made whether derivative of the Y1–Y3 signal has reached a maximum. If it isn't, then admittance Y1 is monitored further in step 652. If it has reached a maximum, then the determination is made in a step 656 as to whether the present time T equals Cl times the time it took for Y1 to reach X1. If T equals C1 times the time it took for Y1 to reach X1, then the deicer is fired or engaged to shed ice in a step 658.

If the condition in step 656 is not met, then a determination is made in a step 660 as to whether the derivative of the Y1–Y3 signal is equal to zero. If this condition is not met, then step 656 is done again. If the derivative of the Y1–Y3 signal has made a zero crossing, then a next step 662 determines whether the present time T equals C2 times the time it took for the derivative of the Y1–Y3 signal to equal zero. If T equals C2 times the time it took for the derivative of the Y1–Y3 signal to equal zero, then the deicer is fired in step 658.

If the condition in step 662 is not met, then a determination is made in a next step 664 as to whether the derivative of the Y1–Y3 signal has reached a minimum. If this condition is not met, then the query of step 662 is made again. If the condition is met, then a determination in a next step 666 is made as to whether the present time T equals C3 times the time it took for the derivative of the Y1–Y3 signal to reach a minimum.

If the condition of step 666 is met, then the deicer is fired. If the condition of step 666 is not met, then a next step 668 makes a determination as to whether the derivative of the Y1–Y3 signal has reached a predetermined level X4. If this condition is met then the deicer is fired in step 658. If not, then the query of step 666 is conducted again.

It should be apparent that the above priority/projection system, derived primarily from the slope derivative curve, increases the probability of producing a threshold signal for activating the deicer at a predetermined ice thickness. When distortion destroys some of the structure and some of the peaks, zero crossings or minima threshold conditions are still produced.

Curves 92' and 94' may be produced by adding a small negative offset to Y3. It can be seen that Y3 may never cross Y1 (giving $R_o=1$) and a simple ratio algorithm will fail to produce a threshold at any thickness. This example is not arbitrary or unrealistic. In fact, it is a very minor distortion caused by a slight offset change arising from residuals left after an ice removal cycle. Often times the offset will cause dramatic offsets with Y3. Going higher than Y3, even at the start of the next accretion. Although Y1 never crosses Y3, the slope difference calculation of curve 96 gives a crossing without a projection error at a thickness that is in a reasonable thickness range between 0.25 and 0.5 in. thickness. Even in this more extreme case the slope difference method will provide a threshold in the useful range without a projection error provided that additional distortion is not present. When distortion destroys one of more of the conditions the algorithm moves through the safety nets. The present invention therefore makes a best estimate of the ice thickness, even as signal quality is progressively lost with increasing chaos in the ice formation.

Ice thickness circuit 638 is therefore an prediction/projection circuit which predicts when to engage the deicers based on the signal from the return electrodes.

Referring now to FIG. 7, residual ice circuit 636 may determine the amount of residual ice on the deicer, after a shedding sequence in several ways.

One method to detect residual ice is to monitor the change in impedance across the electrodes after successive deicing sequences, such as described for the ice presence circuit 634. If the impedance across the electrodes after a particular deicing sequence is greater than a predetermined value, then the pilot is notified of a residual icing problem.

Figure 11:
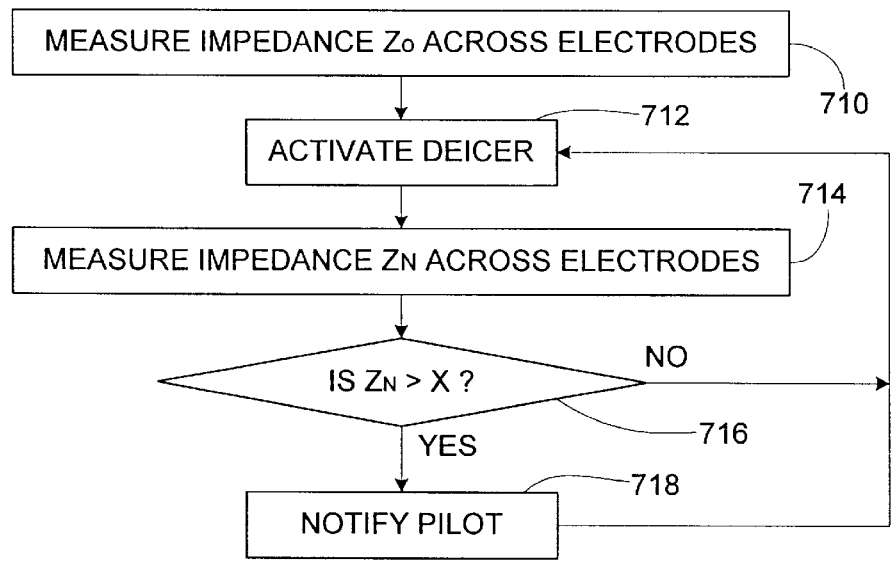
FIG. 11 is a simplified logic flow diagram of a routine for determining residual ice in accordance with the present invention.

Referring now to FIG. 11, a flow diagram of a residual ice detection sequence starts with step 710 during which a measurement of the initial impedance $Z_0$ across the electrodes is taken. The deicer is then activated in a step 712 to shed ice. After deicer activation, a step 714 then measures the impedance $Z_N$ across the electrodes again. A determination is then made in a step 716 of whether $Z_N$ is greater than a predetermined value X. If so, then the pilot is notified in a step 718 and the deicer is then activated again in step 712.

Figure 12:
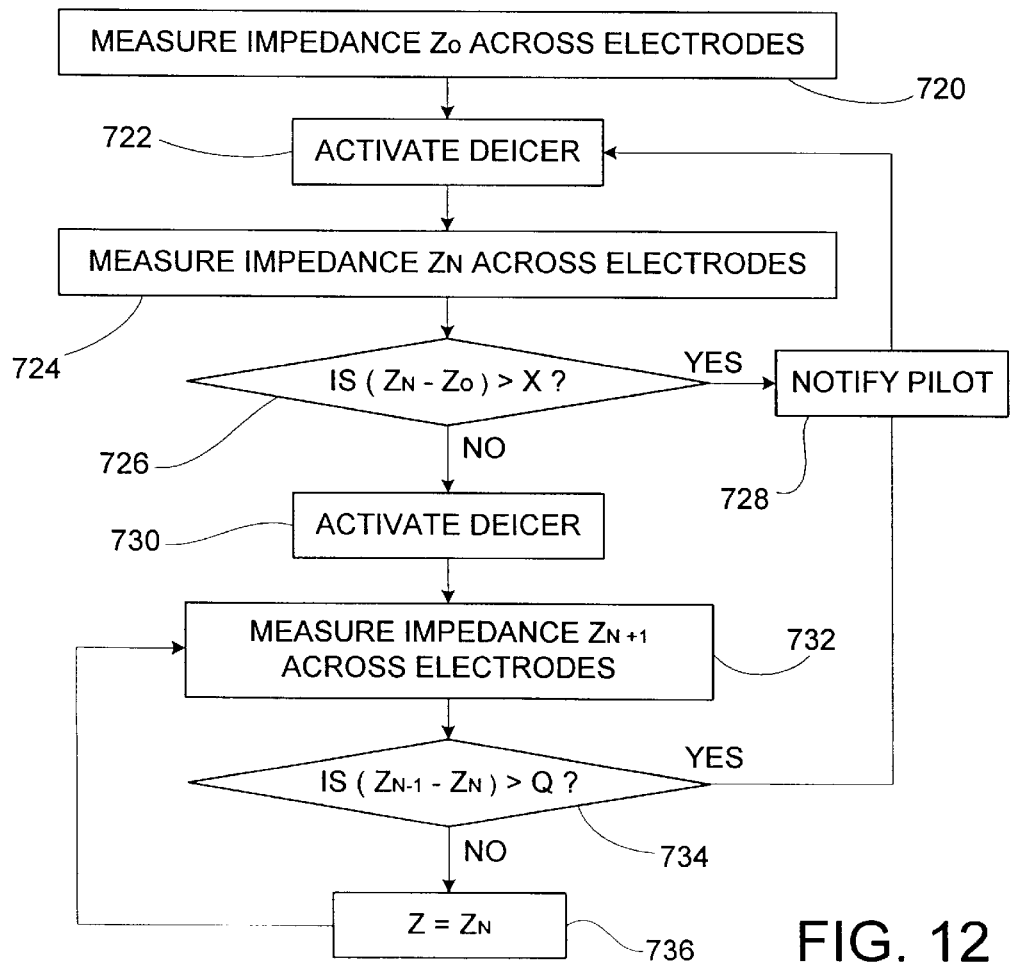
FIG. 12 is a simplified logic flow diagram of a second routine for determining residual ice in accordance with the present invention.

Referring now to FIG. 12, a flow diagram of a residual ice detection sequence starts with step 720 during which a measurement of the initial impedance $Z_0$ across the electrodes is taken. The deicer is then activated in a step 722 to shed ice. After deicer activation, a step 724 then measures the impedance $Z_N$ across the electrodes again. A determination is then made in a step 726 of whether $Z_N$–$Z_0$ is greater than a predetermined value X. If so, then the pilot is notified in a step 728 and the deicer is then activated again in step 722. If not, then the deicer is activated in a step 730. After activation, a step 732 then measures the impedance $Z_{N+1}$ across the electrodes again. A determination is then made in a step 734 of whether $Z_{N+1}$–$Z_N$ is greater than a predetermined value Q. If so, then the pilot is notified in a step 728 and the deicer is then activated again in step 722. If not, then Z is reset to $Z_N$ in a step 736. Z is then measured again in step 732.

Figure 13:
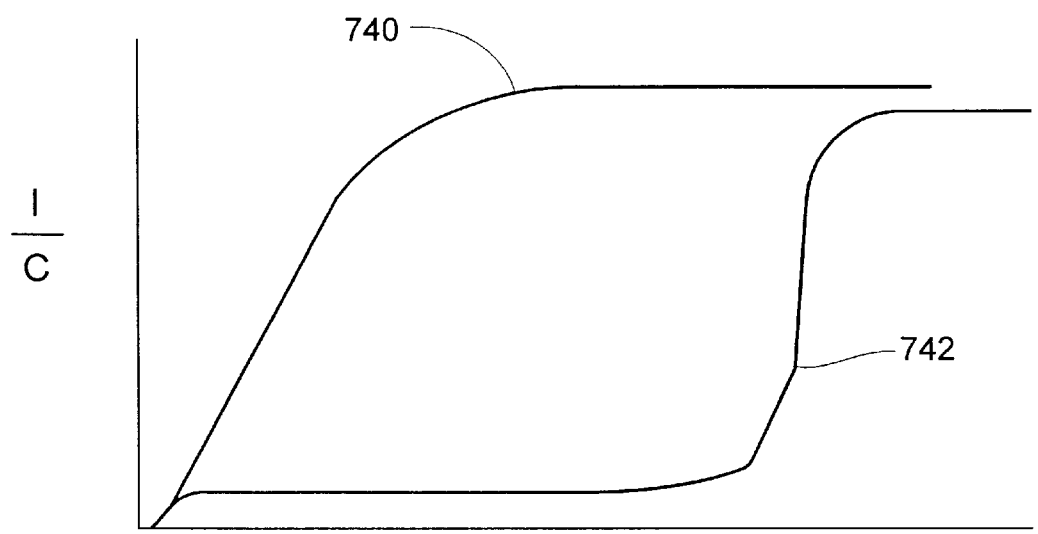
FIG. 13 is a graph showing the capacitance response of the ice detector of FIG. 2 for varying ice thickness.

Referring now to FIGS. 5, 7 and 13, another method for circuit 636 to determine the presence of residual ice over the electrodes is to monitor the capacitance between the electrodes 490 and the guard layer 440 (FIG. 5) by connecting the drive signal to the guard layer. FIG. 13 illustrates a graph of the inverse of capacitance between the electrodes 490 and the guard layer 440 versus time as a pneumatic deicer boot 410 is inflated. Curve 740 represents a deicer with no ice or residual ice deposited thereon. Curve 742 represents a deicer having ice deposited thereon which is well bonded to the deicer surface. As can be seen in FIG. 13, curve 742 has a step type function. Circuit 636 can therefore monitor the shape of the inverse capacitance curve as the deicer is activated. Whichever curve develops determines the icing condition.

Figure 14:
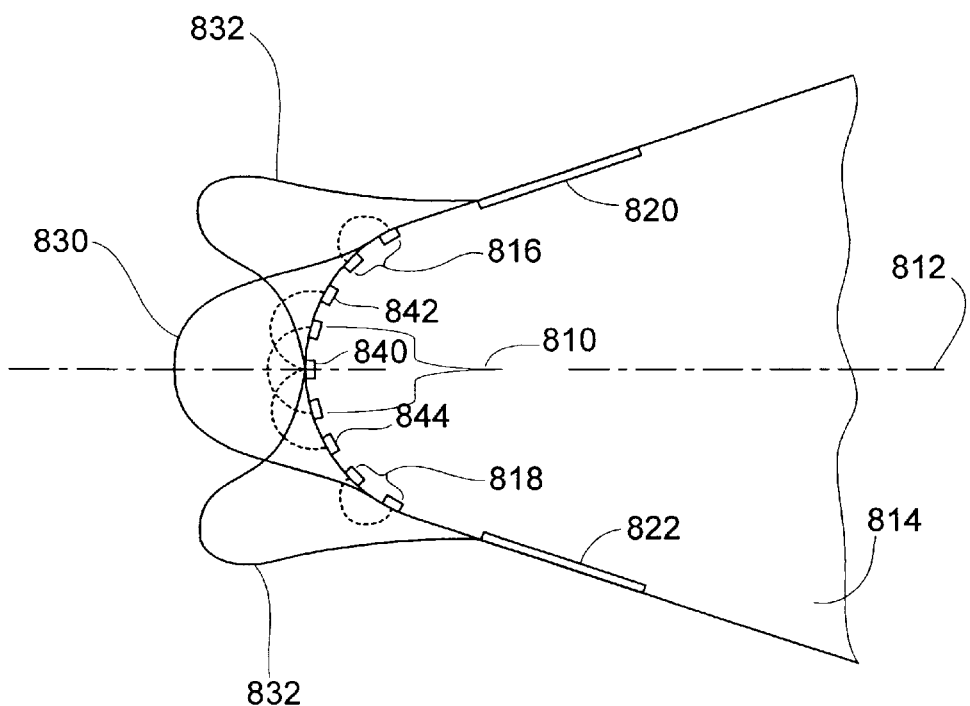
FIG. 14 is a simplified side view of an airfoil having ice detectors in accordance with the present invention.

Referring now to FIG. 14, wherein an ice detection system in accordance with the present invention includes a pair of electrodes 810 arranged in a spanwise direction (so that the substantial length of the electrode is in the plane going into the figure) are located near or at the stagnation line 812 of the airfoil 814. Electrodes 810 are utilized to detect the presence or accumulation of dry growth or rime ice 830 on the airfoil. Electrode pairs 816, 818 are arranged similarly to electrode pair 810 but are disposed at a predetermined chordwise distance off of the stagnation line 812 to detect the presence or accumulation of wet growth, glaze or double horned ice 832 on the airfoil. Alternatively, one electrode 840 may be located near the stagnation line which is coupled to two electrodes 842, 844 off of the stagnation line for detecting the presence of wet growth ice 832. Electrodes 820, 822 are arranged in a chordwise direction (so that the substantial length of the electrode is in the plane of the figure) and are disposed at a predetermined chordwise distance off of the stagnation line 812 to detect the presence or accumulation of runback ice. Electrodes 820, 822 presumably would be at least partially positioned behind any deicing equipment installed on the airfoil. Since the stagnation line 812 changes with airfoil configuration and angle of attack, the exact position of the electrodes will have to optimized for different airfoils and operating characteristics.

Figure 15:
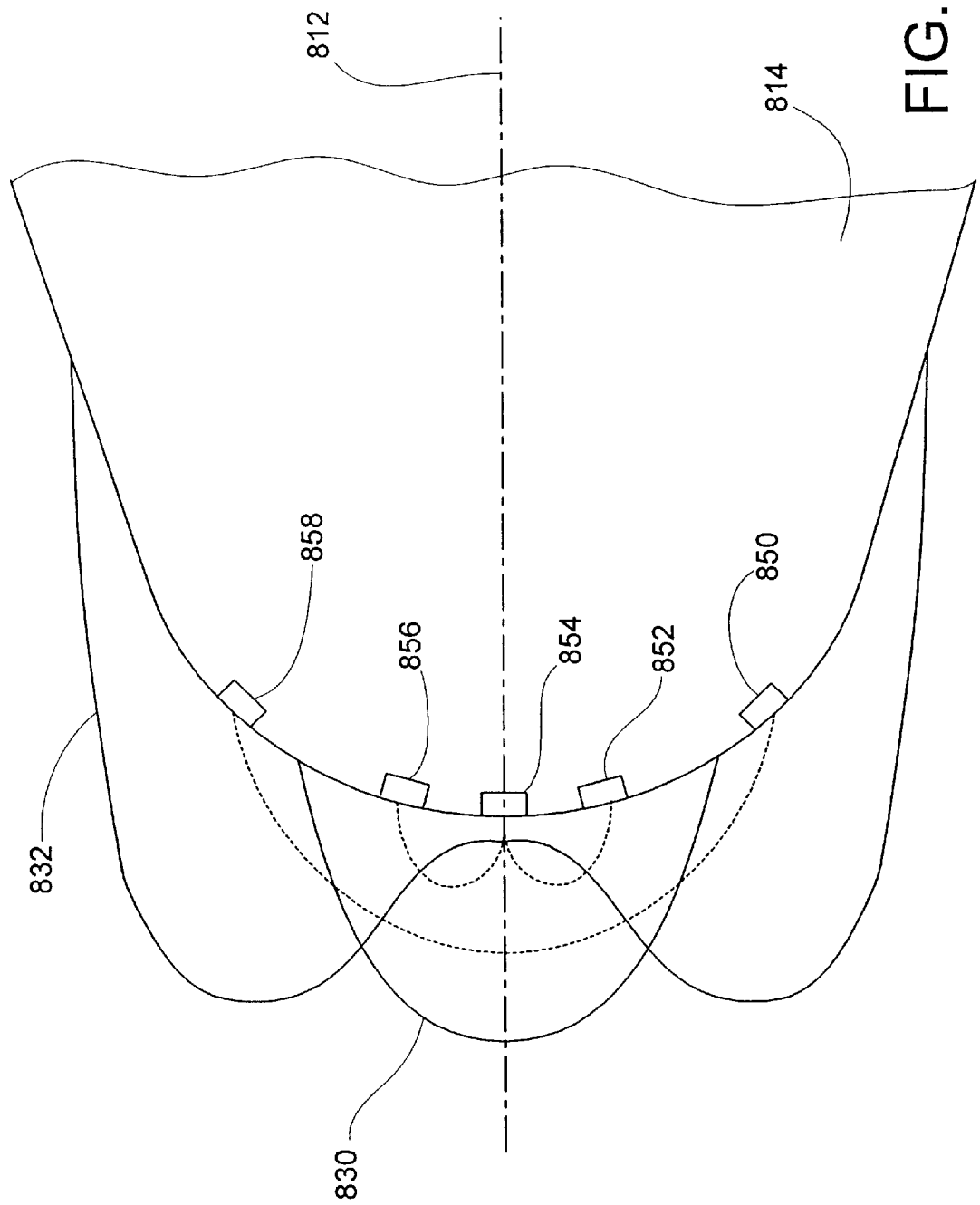
FIG. 15 is a simplified side view of an airfoil having ice detectors in accordance with the present invention.

Referring now to FIG. 15, wherein an ice detection system in accordance with the present invention includes a plurality of electrodes 850–858 arranged in a spanwise direction (so that the substantial length of the electrode is in the plane going into the figure) are located near or at the stagnation line 812 of the airfoil 814. Electrodes 850–858 are utilized to detect the presence or accumulation of ice on the airfoil. Measurement from electrode 854 to electrodes 852 and 856 will detect the presence of rime ice 830. Measurement from electrode 854 to electrodes 850 and 858 will detect the presence of glaze ice 832. Alternatively, measurement can be taken from electrode 854 to 850, 852, 856, and 858 simultaneously.

Figure 16:
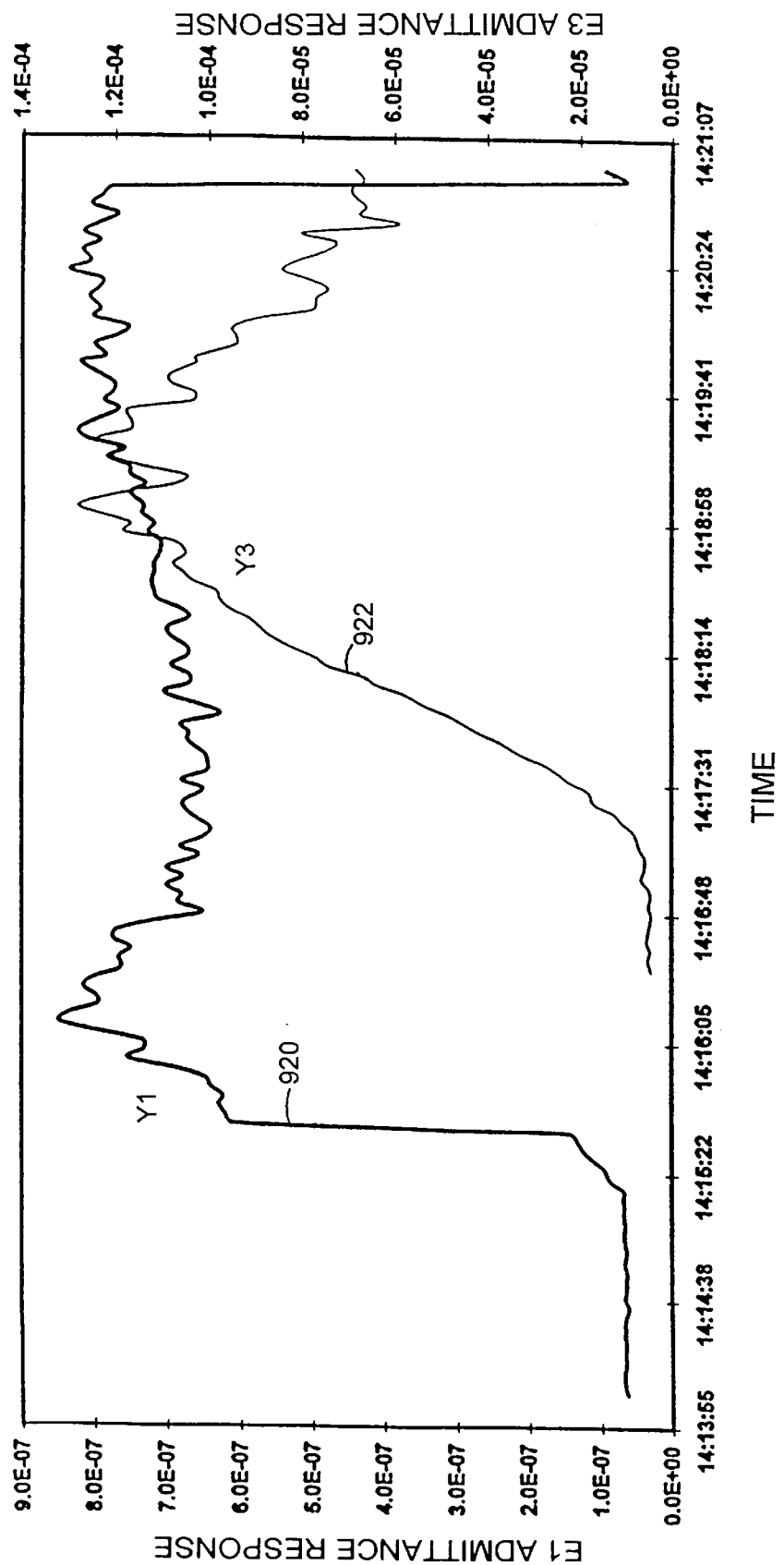
FIG. 16 is a graph showing the admittance response of an ice detector in accordance with the present invention for varying ice thickness.

Referring now to FIG. 16, in reference to an alternative embodiment of the present invention, another graph of typical admittance data from the electrodes versus time is illustrated. The schematic circuit utilized to obtain ice or other contaminant thickness information is shown in FIG. 3. It is to be noted, however, that other circuits may be utilized to obtain impedance data between a drive electrode and a pair of differently spaced return electrodes. One variation is that the signal from the return electrodes may be monitored simultaneously rather than serially using a switch shown. Another variation is to switch the drive signal to different electrodes rather than have a singular drive electrode as shown. In FIG. 3, signal source 122 provides an AC voltage, preferably at an audio frequency. Signal processor circuit 130 is used to compile, manipulate, condition, analyze and interpret impedance data across the drive and return electrodes pairs. The response provided through the return electrodes is measured as a complex impedance which in the most general case may be inductive, capacitive or purely resistive, depending upon the phase of the voltage and current as sensed in the output resistor R (FIG. 3). Signal processor circuit 130 (FIG. 3) computes the admittance, Y, hereby defined here as 1/Z, where Z is the total impedance between the source and return electrodes. Y1 gives the admittance value from a closely spaced electrode and Y3 gives the admittance value from a widely spaced electrode.

FIG. 16 shows a typical admittance response curve over time as ice accumulates over the electrodes and ice thickness increases. The horizontal scale shows time of accretion. The vertical scale shows the admittance across between the drive and return electrodes. Admittance relationships with ice thickness will be generic for all conditions. A Y1 curve 920 shows a rapid rise followed by saturation. A Y3 curve 922 rises more slowly, crossing Y1.

Figure 17:
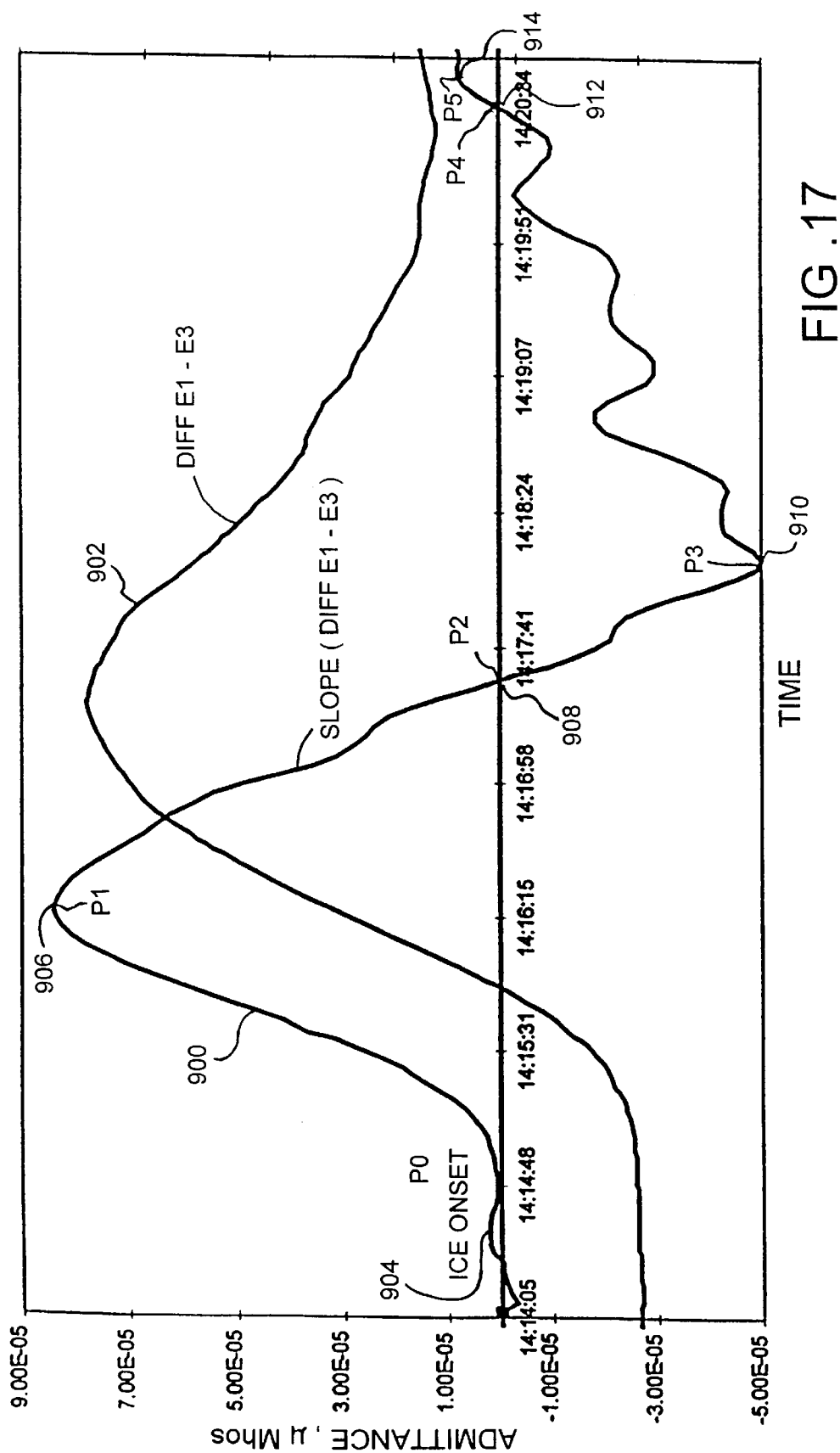
FIG. 17 is a graph showing the difference in admittance response curve between two differently spaced electrode pairs, and the slope of the difference in admittance response curve between two differently spaced electrode pairs.

Referring now to FIG. 17, a difference curve 902 (DIFF E1–E3) shows the difference between the Y1 and the Y3 signals of FIG. 16. A slope curve 900 shows the slope or derivative of the DIFF E1–E3 curve 902. Curve 902 represents the equation:

$$R = \Delta Y13(N) - \Delta Y13(N-1) \text{ or Slope of } (Y1-Y3) \qquad \text{Equation 2}$$

With reference to the alternative embodiment, signal processor circuit 130 (FIG. 3) may function to determine ice thickness by estimating useful ice thickness outputs even with changing conditions between ice removals which often include distorted responses from the electrodes. These changing conditions include variable liquid water content of the ice and intermittent clouds and icing conditions. The alternative operation of circuit 130 also involves the use of the temporal trends inherent in the electrode responses as the ice formation builds during the icing encounter. What is meant by temporal is that the ice information is analyzed over a specified period of time. The trends are determined by computing the time derivative of the difference between the wide spaced to the narrow spaced electrodes. The response provided through the return electrodes is measured as a complex impedance which in the most general case may be inductive, capacitive or purely resistive, depending upon the phase of the voltage and current as sensed in the output resistor R (FIG. 3).

FIG. 17 shows a response as ice accretes or builds up over the electrodes over time and five alternately identifiable priority points on the slope curve 900. The vertical scale shows the admittance measured across the electrodes. The horizontal scale shows real time of accretion. The maximum target amount of accretion before deicer initiation was determined to be 0.5 inches. The time to reach the target ice thickness can vary greatly depending upon the test conditions. Yet, the same admittance relationships occur with respect to approximately 0.5 in. ice thickness. A single plot against ice thickness will therefore be generic for all conditions. An ice onset point P0 (904) is identified when the slope curve 900 first goes above a predetermined admittance value. Thereafter follow a maximum point or peak P1 (906), a plus to minus zero crossing point P2 (908), a minimum point or peak P3 (910), a minus to plus zero crossing point P4 (912), and a second peak point P5 (914). These priority points are utilized to provide a pilot with a warning to engage deicing equipment. It is to be noted that impedance rather than admittance could be utilized to establish priority points.

Ice Onset is defined as the reduction of impedance on a specified electrode installed on a specific deicer. A fixed impedance and outside air temperature value has been set for ice onset (See Table 2). This trip level is determined through Icing Wing Tunnel (IWT) testing and flight testing in natural icing conditions. An Ice light will illuminate indicating to the pilot that a small amount of ice has accumulated on the airfoil.

Priority P1 is defined as the highest peak or greatest local maxima in the slope(DIFF) curve 900 above a defined deadband. This maxima must be positive in value and change from an increasing to a decreasing function. The Deadband is a predetermined fixed value (See Table 1) taken from a database. A deadband limit is employed to prevent any premature P1 priorities caused by noise from within the system or from external sources.

Priority P2 is defined as the slope(DIFF) curve crossing the zero plane from positive to negative.

Priority P3 is defined as a local minima of the slope(DIFF) curve. This minima must be negative in value and change from a decreasing to an increasing function.

Priority P4 is defined as the slope(DIFF) curve crossing the zero plane from negative to positive in value.

Priority P5 is defined as a local maxima in the slope (DIFF) curve. This maxima must be positive in value and change from an increasing to a decreasing function.

Utilization of the priority points, (P0, P1, P2, P3, P4 and P5) on the slope(DIFF) curve 900 provides a level of immunity from distortion in the shapes and trends in Y3 and Y1 (illustrated in FIG. 16) which may arise from chaotic ice formations.

Circuit 130 computes a progression of conditions relying on the slope curve 900 and its corresponding priority points P1–P5 in order to predict or project a time when the accumulated ice will reach a targeted thickness. This projected time may then be utilized to trigger the deicer to cycle and remove the ice. For example, a succession of deice projections can be constructed using predetermined points on curve 900 to serve as a series of "safety nets". The preferred predetermined points are those that are relatively immune from noise and distortion. Such points are illustrated on slope 900 as P0, P1, P2, P3, P4, and P5. A table of prioritized projected times utilizing predetermined threshold points is illustrated in Table 2.

FIG. 15(a) (Table 2) also lists a Percent Accretion Ratio (PAR) for each priority. The PAR is defined by the amount of change in Z3(E3) from a fixed variable within the database. The actual impedance value (E3) is divided by the database impedance value (E3 ref) or (accretion sensor/accretion reference). A minimum change must be achieved (See Table 1) prior to or at the same time a defined priority time projection is completed. This accretion ratio provides the algorithm with not only a time based signal, but an event based signal. Only when the two signals have met their defined criteria, does the "de-ice" light illuminate and the pilot is instructed to de-ice the plane.

It is to be noted that Table 2 illustrates approximate preferred minimum Priority Delay ($C_N$), minimum PAR (E3/E3ref), minimum Ice Onset impedance (E1), minimum Deadband admittance, minimum Accretion Reference impedance E3ref, and minimum Residual impedance (E2-E1) values for the present invention. These values, however, are for exemplary purpose only and are not to be limiting in that each system may have unique optimal parameters.

The first preference projection is P0 is a minimum or threshold admittance value, coupled with a minimum or threshold outside air temperature. An algorithm clock for providing the delta times for the time projections of the algorithm is started at P0 (ice onset). TABLE 2 shows a priority delay factor C0 for priority point P0. If only P0 has occurred, the time projection is C0. This time projection along with a required accretion percent ratio will be used to activate a "de-ice" light in the cockpit. If P0 is the only priority condition detected, the de-ice light will be illuminated after the C0 projected time has elapsed.

If ice continues to accrete, P1 is encountered and a second time projection for P1 is computed by multiplying the time at which P1 is detected by a C1 priority delay factor (or projection constant). P0 is now deactivated and a shorter projection is in effect. If other priority conditions are detected subsequent to P1, P1 will be deactivated. If P1 is the last condition detected, its projected time will be used to light the de-ice light after the projected time has elapsed and the PAR is achieved. In most cases the accretion will continue to generate the curves, and the next action will be the detection of P2. TABLE 2 shows that the time projection of P2 is computed by multiplying a priority delay factor C2 by the time expired from ice onset to P2. The time projection for P1 is now deactivated and a shorter time projection is in effect. The potential projection error is reduced because the projection time is reduced by that factor. As the accretion proceeds further the slope difference goes through P3. When this is detected the priority P2 is deactivated and a projection constant of C3 is used to define yet a shorter projection time ($C3*\Delta t_3$). The error is reduced further. As the accretion proceeds further the slope difference goes through P4. When this is detected the priority P3 is deactivated and a projection constant of C4 is used to define yet a is shorter projection time ($C4*\Delta t_4$). The error is reduced further. Finally, P5 is reached and the priority P4 is deactivated and a projection constant of C5 is used to define yet a shorter projection time ($C5*\Delta t_5$). . It can be seen from Table 2 that since the preferred C5 is equal to one, the deicer is fired immediately without further time elapse.

It can be seen that the above priority, time projection and required accretion system, derived primarily from the slope (DIFF) curve, increases the probability of producing a threshold signal for activating the "de-ice" light at a predetermined ice thickness. When distortion destroys some of the structure and some of the peaks are lost, zero crossings or minima threshold conditions are still produced, though with errors that increase as this distortion worsens.

Another factor taken into account in the present invention is residual ice. Residual ice is defined by a specified amount of ice which remains after a de-icing cycle. The level to which the residual ice lamp level is set (See Table 2) is based upon Icing Wind Tunnel (IWT) testing and actual icing flight data. If the residual ice level is exceeded, a "Residual" ice light will illuminate in the cockpit.

Figure 18:
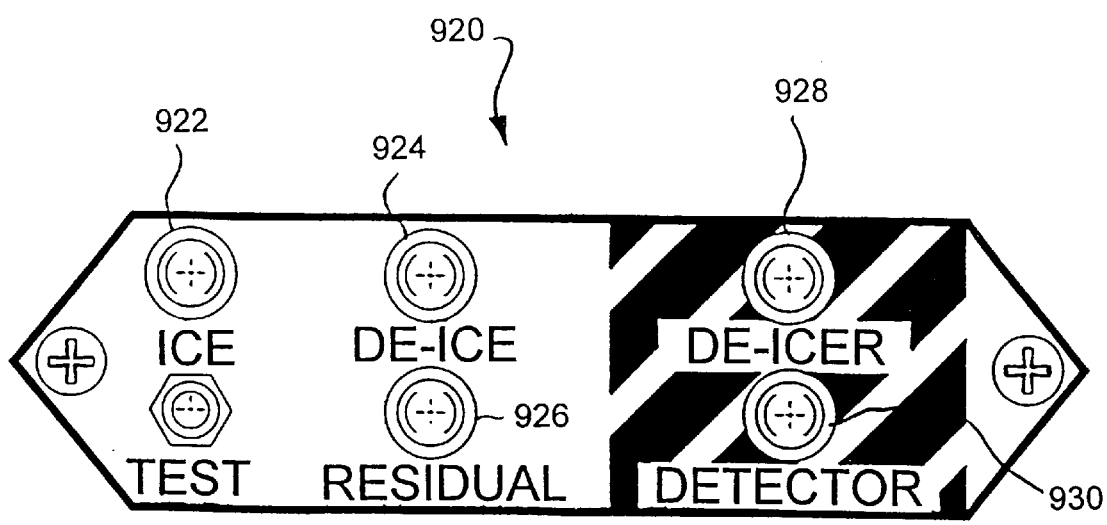
FIG. 18 is front view of a cockpit display in accordance with the present invention.

Referring now to FIG. 18, the system described above is used to activate lights for the pilot (crew) of an aircraft. A typical annunciator panel 920 is located in the cockpit. The ice onset priority is used to activate an "ice" light 922. This function as a "heads-up" for the crew that ice is starting to form over the sensors and de-icer surface. The sensors are located about the stagnation line of the airfoil. This is the location of maximum collection efficiency of ice on the airfoil and thus is the first place ice will form in flight. Another light 924 is called "de-ice" and is lit when a time projection is completed and the respective PAR is present. As ice continues to form (thicken), this light alerts the crew at the appropriate time to activate (inflate) the pneumatic de-icers. This function is important as premature activation of the pneumatic de-icers will result in poor shedding and waiting too long may produce aerodynamic penalties such as excessive drag causing the airspeed to decay. It is desired to activate the "de-ice" light when the ice thickness reaches a nominal value of 0.5 inch. A "residual" light 926 alerts the pilot following de-icer activation (inflation) if insufficient ice has been removed. A "de-icer" light 928 alerts the pilot the deicer is not inflating appropriately. A deicer failure is detected by driving the guard electrode and detecting a change in impedance from the return electrodes during inflation. With each inflation, there should be an appropriate rise in impedance across the electrodes. If the minimum change in impedance is not detected, the de-icer light 928 is lit. A "detector" light 930 alerts the pilot of failures in the ice detector. A failure is assumed if the detector signal processor detects either a short or open across the electrode circuits.

Figure 19:
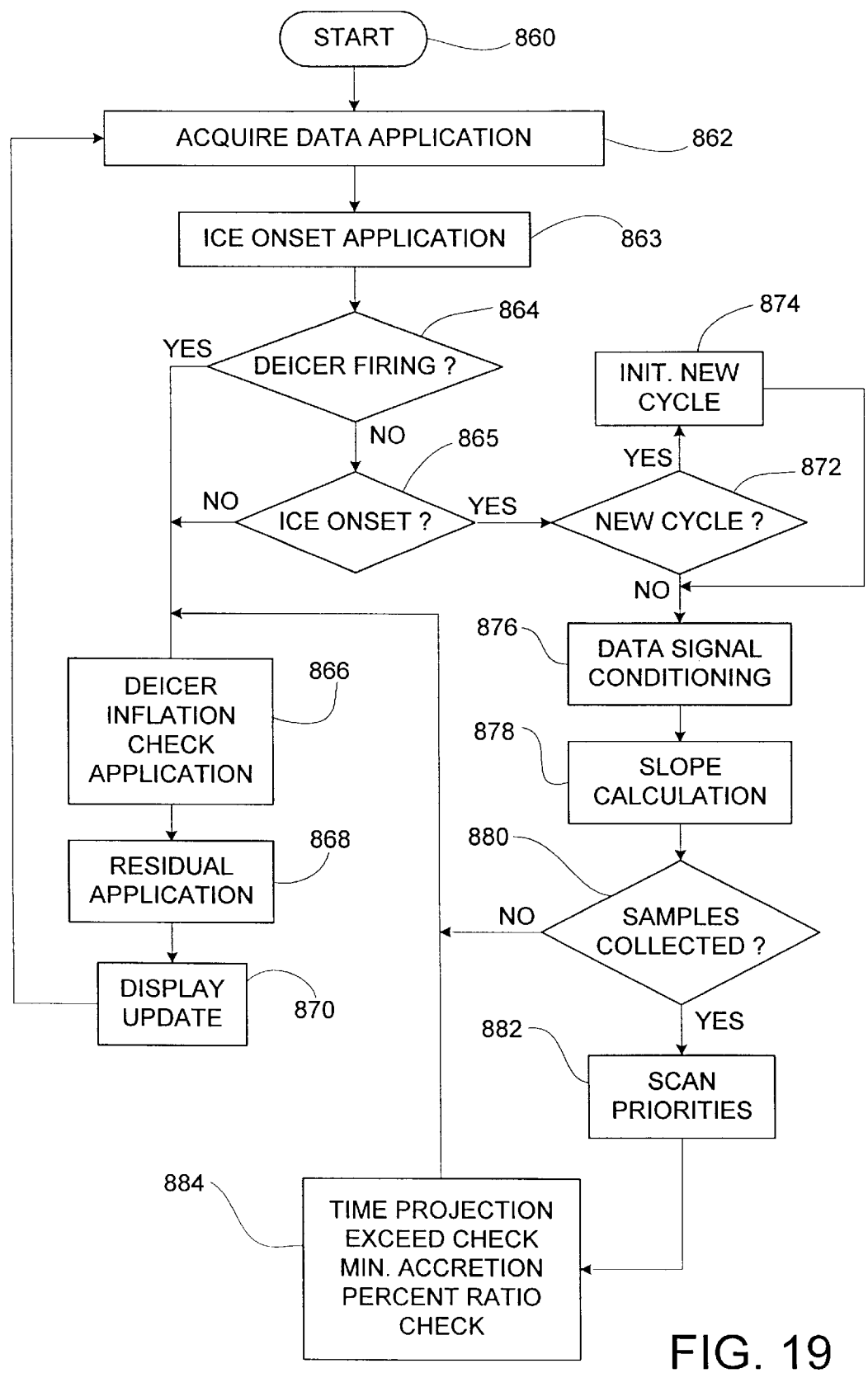
FIG. 19 is a simplified logic flow diagram of a routine for an ice detection system in accordance with an alternative embodiment of the present invention.

Referring now to FIG. 19, FIG. 17, and Table 2 an alternative embodiment for the ice detection system in accordance with the present invention wherein the signal processor 130 shown in FIG. 3 processes data provided by the electrodes. The flow chart of FIG. 19 summarizes the general operation of the signal processor 130. In a first step 860 the application is started. Then in a step 862 the processor 130 acquires impedance data from the electrodes and outside air temperature measurement made by a temperature probe (not shown). In a step 863 a determination is made whether or not there is ice onset. The ice onset condition is triggered by a predetermined impedance level across the electrodes and a predetermined outside air temperature measurement. If either the impedance or temperature are above their specified values, the ice onset condition is not met. A step 864 determines if deicers have been activated. If the deicers have been turned on, a step 866 determines if the deicers have inflated properly. A next step 868 determines if there is any residual ice on the deicer. The residual ice is determined by measuring the impedance across to electrodes for a minimum value. If the impedance is below a predetermined value then residual ice is assumed. In step 870 the cockpit display is updated to indicate the previous determined conditions.

If in step 864 the determination was made that the deicers had not been engaged, the determination is made in a step 865 whether the ice onset condition has been met. If ice onset is false, the deicer inflation is checked in step 866. If the ice onset condition or priority has occurred, then a step 872 queries whether this is new ice detection cycle. If it is a new cycle then a cycle initialization step 874 is completed. The initialization step resets the system for a new cycle. What is meant by reset is the cycle time counter is reset, filters are cleared, the priority is reset to ice onset, the PAR is reset and the time projection calculation is reset.

In a next step 876 the data signals acquired in step 862 is conditioned and used in calculating the slope difference curve 900 of FIG. 17. Conditioning of the data signal includes techniques that are well known to those skilled in the art, such as converting the impedance signal to an admittance signal, normalizing the values by removing offsets, filtering the signal through a band pass filter, applying a gain to the normalize, filtered signal and then updating state tables with the conditioned signal.

Once the data signal has been conditioned, in a step 878 the Y1–Y3 difference signal or difference curve 902 and the slope difference curve 900 are calculated.

After the difference curve and the slope difference curve are established, a step 880 determines whether a minimum amount of data samples were acquired in step 862. If the minimum samples were not collected, then the data acquisition step 862 is begun again. If enough samples were collected in step 880 then a step 882 scans the slope difference curve to see which, if any, of the P1–P5 priorities have occurred.

Once a determination of the highest attained priority is made, a step 884 determines whether the time projection for the highest attained priority has elapsed and whether the minimum required PAR has been met.

The display is then updated in step 870 to show the status of the ice accumulation to the pilot. If both of the time projection and minimum PAR have been exceeded, then the de-ice light on the display is lit in step 870. The de-ice light notifies the pilot that he should activate the deicers to shed ice. If either one of the time projection and minimum PAR conditions have not been met, the de-ice light is not lit.

Figure 20:
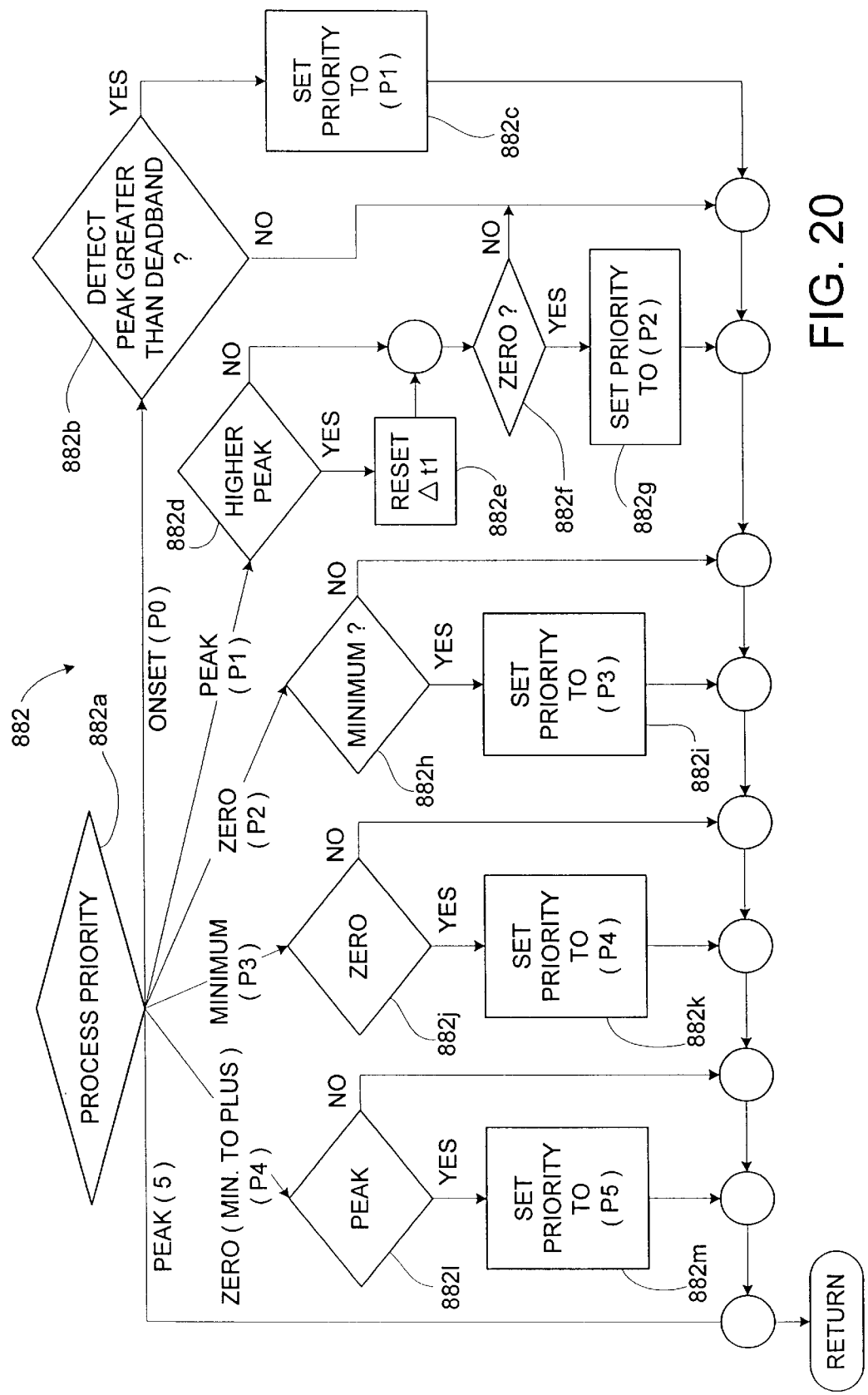
FIG. 20 is a simplified logic flow diagram of a routine for scanning priority points for an ice detection system in accordance with an alternative embodiment of the present invention.

Referring now to FIG. 20 wherein the scan priority step 882 is further illustrated. Step 882 is entered at 882a and if ice onset has occurred in step 866 then a step 882b is performed to determine if a peak P1 in the slope difference signal 900 has occurred and whether the peak P1 is greater than a predetermined deadband value. If the peak is greater than the deadband value then the priority is set to that peak P1 in a step 882c. If the peak is not greater than the predetermined deadband value then routine 882 is exited and returned to step 884 in FIG. 19. If in step 882a it is determined that the priority has been set to P1, then step 882d determines whether a higher peak has been detected than the P1 peak. If yes, then a step 882e resets the Δt1 time shown in Table 2 to the new time of the new peak P1.

In a step 882f, a determination is made if the slope difference signal 900 has made a plus two minus zero crossing P2. If not, then the set priorities routine 882 returns without setting priority to P2. If a zero crossing has occurred in step 882f, then the priority is set to P2 in a step 882g.

If at step 882a the priority had previously been set to P2, then a path P2 is taken to a step 882h and a determination is made if the slope difference signal 900 has reached a minimum value P3. If not, then the priority remains at P2 and routine 882 is exited. If a minimum has been detected then the priority is set to P3 in a step 882i and the set priority routine 882 is exited.

If in step 882a a P3 had been previously detected then the path is taken to a step 882j wherein a determination is made if the slope difference signal 900 had made a minus to plus zero crossing P4. If the minus to plus zero crossing has not occurred, then the set priorities application is exited. If a minus to plus zero crossing has occurred, then the priority is set to P4 and the set priority application is exited.

If at step 882a P4 has previously been determined, then a path is taken to a step 882l wherein a determination is made if the slope difference signal 900 has reached a peak P5. If a peak has not been reached, then the set priorities routine 882 is exited. If a peak P5 has been detected, then the priority is set to P5 in a step 882m and the set priority routine is exited.

If in step 882a a P5 peak had previously been detected, then the set propriety routine is exited.

In yet another alternative embodiment of the present invention, the signal processor circuit 130 may have stored in its data base a "calibration" plot of admittance for a calibration electrode pair or an assumed electrode pair. A singular pair of electrodes may be then be used to collect admittance data in real time. The admittance data thus collected could then be compared with the calibration admittance plot to obtain the difference signal and the slope difference signal. In this case, only one pair of electrodes would be needed for operation of the present invention.

It is to be noted that the present invention may be implemented using analog circuitry, dedicated digital circuitry, a software program or a combination thereof using circuit designs well known in the prior art. The equivalence between analog, dedicated digital and software is illustrated (in a different context) in U.S. Pat. No. 4,294,162 (Fowler et al.).

It is also to be noted that the present invention may be utilized in conjunction with many types of surfaces and many types of deicers. To this end, the present invention may be utilized either as part and parcel with a deicer or as a stand alone system.

Although the invention has been shown and described with exemplary embodiments thereof, it should be understood by those skilled in the art that the foregoing and various other changes, omissions and additions may be made therein and thereto without departing from the spirit and the scope of the invention.

We claim:

1. An apparatus for detecting ice accumulation on a surface comprising:
   at least three electrodes spaced apart from one another; and
   a signal processor connected to said electrodes and being operative to:
     (i) determine first and second admittance signals across respective pairs of the electrodes; and
     (ii) determine thickness of ice on the surface using changes with respect to time between the first and second admittance signals.

2. An apparatus for detecting ice accumulation on a surface in accordance with claim 1, wherein the signal processor is used to:
   (a) calculate the difference between the first and second admittance signals;
   (b) calculate the slope of the difference between the first and second admittance signals versus time; and
   (c) determine the thickness of ice on the surface using the slope of the difference between the first and second admittance signals versus time.

3. An apparatus for detecting ice accumulation on a surface in accordance with claim 1, wherein the signal processor utilizes the slope of the difference between the first and second admittance signals versus time to establish at least one priority point to predict a time when the ice will reach a targeted thickness.

4. An apparatus for detecting ice accumulation on a surface in accordance with claim 3, wherein the signal processor compares at least one admittance signal to a reference admittance to predict a time when the ice will reach a targeted thickness.

5. An apparatus for detecting ice accumulation on a surface in accordance with claim 4, wherein the signal processor provides an advisory signal when the predicted time has elapsed.

6. An apparatus for detecting ice accumulation on a surface in accordance with claim 1, wherein the spacing between the electrode pairs is different.

7. An apparatus for detecting ice accumulation on a surface in accordance with claim 1, wherein the signal processor provides an advisory signal when it detects the ice has reached a targeted thickness.

8. An apparatus for detecting ice accumulation on a surface in accordance with claim 1, wherein the signal processor determines the admittance signals by measuring complex impedance across the pairs of electrodes.

9. An apparatus for detecting ice accumulation on a surface in accordance with claim 1, wherein the signal processor determines the thickness of ice on the surface as a function of the time derivative of the difference between the first and second admittance signals.

10. An apparatus for detecting ice accumulation on a surface in accordance with claim 1, wherein the electrodes are integrated into an ice detection patch.

11. An apparatus for detecting ice accumulation on a surface in accordance with claim 1, wherein the signal processor converts analog signals from the electrodes to digital data that is used to determine thickness of ice on the surface.

* * * * *